(12) United States Patent
Ishii

(10) Patent No.: US 11,465,667 B2
(45) Date of Patent: Oct. 11, 2022

(54) RACK AND PINION TYPE STEERING GEAR UNIT

(71) Applicant: NSK LTD., Tokyo (JP)

(72) Inventor: Tatsuya Ishii, Maebashi (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 17/261,484

(22) PCT Filed: Jul. 16, 2019

(86) PCT No.: PCT/JP2019/027939
§ 371 (c)(1),
(2) Date: Jan. 19, 2021

(87) PCT Pub. No.: WO2020/017503
PCT Pub. Date: Jan. 23, 2020

(65) Prior Publication Data
US 2021/0309284 A1 Oct. 7, 2021

(30) Foreign Application Priority Data
Jul. 20, 2018 (JP) .............................. JP2018-136382

(51) Int. Cl.
*B62D 3/12* (2006.01)
*F16C 29/02* (2006.01)
*F16C 35/02* (2006.01)

(52) U.S. Cl.
CPC ................ *B62D 3/12* (2013.01); *F16C 29/02* (2013.01); *F16C 35/02* (2013.01); *B62D 3/126* (2013.01); *F16C 2326/24* (2013.01)

(58) Field of Classification Search
CPC .......... B62D 3/12; B62D 3/123; B62D 3/126; F16C 29/02; F16C 35/02; F16C 2326/24
See application file for complete search history.

(56) References Cited

U.S. PATENT DOCUMENTS 7,665,747 B2 * 2/2010 Arlt .................. F16C 33/20
384/296
7,954,395 B2 * 6/2011 Ishii .................... B62D 3/12
74/422

(Continued)

FOREIGN PATENT DOCUMENTS

JP 2004-347105 A 12/2004
JP 2005014685 A * 1/2005

(Continued)

OTHER PUBLICATIONS

International Search Report (PCT/ISA/210) issued in PCT Application No. PCT/JP2019/027939 dated Oct. 1, 2019 with English translation (seven (7) pages).

(Continued)

*Primary Examiner* — Adam D Rogers
(74) *Attorney, Agent, or Firm* — Crowell & Moring LLP

(57) ABSTRACT

A rack housing has a concave portion first inclined surface 45 on the inner side surface of an engaging concave portion located on the opening side that is inclined in a direction toward the back side while going outward in the radial direction. The rack bush has a convex portion first inclined surface on the outer side surface of an engaging convex portion that faces the concave portion first inclined surface, and that is inclined in a direction toward the back side while going outward in the radial direction. The convex portion first inclined surface is pressed outward in the radial direction against the concave portion first inclined surface, and the other outer side surface of the engaging convex portion facing the back side is pressed in the axial direction against the other inner side surface of the engaging concave portion facing the opening side.

9 Claims, 17 Drawing Sheets

(56) References Cited

U.S. PATENT DOCUMENTS

| | | | |
|---|---|---|---|
| 8,813,594 B2 * | 8/2014 | Amada | F16H 55/285 |
| | | | 74/388 PS |
| 8,925,939 B2 * | 1/2015 | Ohashi | B62D 3/12 |
| | | | 280/93.514 |
| 10,689,023 B2 * | 6/2020 | Span | B62D 3/126 |
| 11,104,372 B2 * | 8/2021 | Terada | B62D 3/126 |
| 2004/0076353 A1 | 4/2004 | Kubota et al. | |
| 2012/0237146 A1 | 9/2012 | Tange et al. | |
| 2016/0059883 A1 | 3/2016 | Mizutani et al. | |
| 2017/0130769 A1 | 5/2017 | Ikeda et al. | |
| 2021/0309283 A1 * | 10/2021 | Ishii | F16H 57/02 |

FOREIGN PATENT DOCUMENTS

| | | | |
|---|---|---|---|
| JP | 2008-265590 A | | 11/2008 |
| JP | 2009202742 A | * | 9/2009 |
| JP | 2012-57717 A | | 3/2012 |
| JP | 2012-254780 A | | 12/2012 |
| JP | 2014-104961 A | | 6/2014 |
| JP | 2014-227028 A | | 12/2014 |
| JP | 2015-6850 A | | 1/2015 |
| JP | 2015-189378 A | | 11/2015 |
| JP | 2016-97792 A | | 5/2016 |
| JP | 2017-87972 A | | 5/2017 |
| KR | 10-0452297 B1 | | 10/2004 |
| KR | 20100135135 A | * | 12/2010 |
| KR | 20110075149 A | * | 7/2011 |
| KR | 10-2012-0026165 A | | 3/2012 |
| WO | WO 2014/196582 A1 | | 12/2014 |

OTHER PUBLICATIONS

Japanese-language Written Opinion (PCT/ISA/237) issued in PCT Application No. PCT/JP2019/027939 dated Oct. 1, 2019 (six (6) pages).

* cited by examiner

FIG. 13A
FIG. 13B
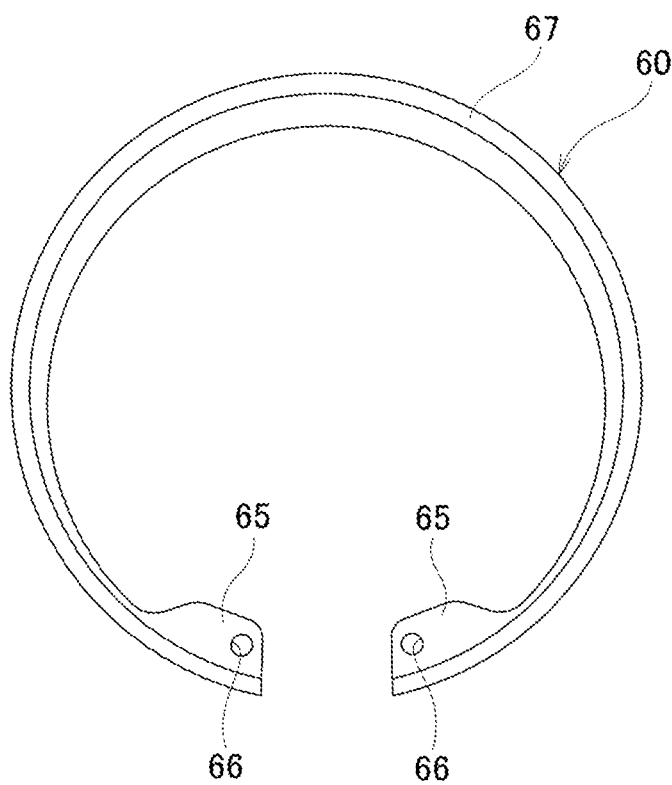
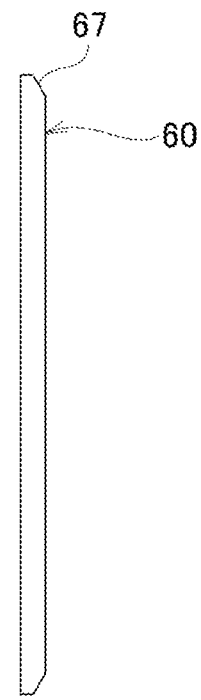

Prior Art

RACK AND PINION TYPE STEERING GEAR UNIT

TECHNICAL FIELD

The present invention relates to a rack and pinion type steering gear unit that constitutes a steering apparatus for applying a steering angle to steered wheels of an automobile.

BACKGROUND ART

A steering apparatus equipped with a rack and pinion type steering gear unit is widely used in steering apparatuses for automobiles because a rack and pinion type steering gear unit may be configured to be compact and lightweight, and has high rigidity to obtain a good steering feeling. In a steering apparatus equipped with a rack and pinion type steering gear unit, the rotational movement of the steering wheel operated by the driver is converted into a reciprocating linear movement by the steering gear unit, and a steering angle is applied to the steered wheels via tie rods.

The rack and pinion type steering gear unit includes a pinion shaft to which the rotational movement of the steering wheel is transmitted, a rack shaft that converts the rotational movement of the pinion shaft into a linear movement, and a housing that houses the pinion shaft and the rack shaft; and pinion teeth that are provided on the pinion shaft and rack teeth that are provided on the rack shaft engage with each other. As a result, the rotational movement of the pinion shaft is converted into the linear movement of the rack shaft, and the tie rods connected to both sides in the axial direction of the rack shaft are pushed and pulled to apply a steering angle to the steered wheels.

In order to efficiently transmit the rotational movement of the steering wheel to the steered wheels, it is important to support the rack shaft inside a rack housing provided in the housing so as to enable smooth displacement in the axial direction. In order for this, a slide bearing is arranged inside the rack housing, and the rack shaft is slidably supported by the slide bearing. FIG. 17 illustrates a conventional structure as described in JP 2015-189378A, in which a rack shaft is supported inside a rack housing by a slide bearing.

In the structure described in JP 2015-189378A, a rack bush 1 made of synthetic resin is used as the slide bearing. The rack bush 1 has a tubular body 2 having a substantially cylindrical shape, and an engaging convex portion 3 protruding further outward in the radial direction than the outer circumferential surface of the tubular body 2. The rack bush 1 is arranged inside the rack housing 4 via a metal end case 5 fitted in the opening portion of the rack housing 4.

More specifically, the tubular body 2 of the rack bush 1 is internally fitted into a small-diameter hole portion 6 provided on the inner circumferential surface of the end case 5, and the engaging convex portion 3 of the rack bush 1 is arranged inside a large-diameter hole portion 7 provided on the inner circumferential surface of the end case 5. A metal stopper 8 is internally fitted in the large-diameter hole portion 7 of the end case 5. Therefore, the engaging convex portion 3 is held in the axial direction between the side surface in the axial direction of the stopper 8 and a stepped surface 9 existing between the small-diameter hole portion 6 and the large-diameter hole portion 7 of the inner circumferential surface of the end case 5.

With the structure described above, the outer circumferential surface of the rack shaft 10 may be slidably supported by the inner circumferential surface of the tubular body 2 of the rack bush 1. Therefore, the rack shaft 10 may be smoothly displaced in the axial direction, and the rotational movement of the steering wheel may be efficiently transmitted to the steered wheels. The engaging convex portion 3 of the rack bush 1 is held in the axial direction between the side surface in the axial direction of the stopper 8 and the stepped surface 9 of the end case 5, so when the rack shaft 10 slides, it is possible to prevent the rack bush 1 from moving in the axial direction with respect to the end case 5. Therefore, it is possible to prevent abnormal noise from being generated due to the collision between the rack bush 1 and the end case 5 or the stopper 8.

CITATION LIST

Patent Literature

[Patent Literature 1] JP 2015-189378A

SUMMARY OF INVENTION

Technical Problem

However, in the structure described in JP 2015-189378A, end members (not illustrated) that are attached to both sides in the axial direction of the rack shaft 10 collide with the end case 5 when the steering wheel is steered to the steering limit, or so-called end contact, and there is a possibility that a large load in the axial direction may be inputted to the end case 5, so there is room for improvement in terms of stabilizing the posture of the rack bush 1.

In view of the above circumstances, an object of the present invention is to provide a rack and pinion type steering gear unit structure that is capable of supporting a slide bearing that slidably supports the rack shaft with respect to the rack housing without looseness in the axial direction even without being held between two members in the axial direction.

Solution to Problem

The rack and pinion type steering gear unit of the present invention includes a housing, at least one slide bearing, a rack shaft, and a pinion shaft.

The housing has a rack housing having a tubular shape that is open on both sides in the axial direction and including an engaging concave portion on the inner circumferential surface thereof, and a pinion housing.

The at least one slide bearing has a tubular body, and an engaging convex portion protruding further outward in the radial direction than the outer circumferential surface of the tubular body and arranged inside the engaging concave portion, and is fitted inside the rack housing.

The rack shaft has rack teeth, is supported by the inner circumferential surface of the at least one slide bearing so as to be slidable in the axial direction, and is arranged inside the rack housing.

The pinion shaft has pinion teeth on the outer circumferential surface thereof that engage with the rack teeth, and is rotatably supported inside the pinion housing.

The engaging convex portion is provided on a portion of the at least one slide bearing located on the opening side of the rack housing.

The engaging concave portion includes a pair of inner side surfaces, and an inner side surface of the pair of inner side surfaces that is located on the opening side of the rack housing includes a concave portion first inclined surface that is inclined toward the back side of the rack housing while going toward the outer side in the radial direction.

The engaging convex portion includes a pair of outer side surfaces, and an outer side surface of the pair of outer side surfaces that faces the concave portion first inclined surface in the axial direction includes a convex portion first inclined surface that is inclined toward the back side of the rack housing while going toward the outer side in the radial direction.

In the rack and pinion type steering gear unit of the present invention, by pressing the convex portion first inclined surface toward the outer side in the radial direction with respect to the concave portion first inclined surface, a surface of the at least one slide bearing facing the back side of the rack housing is pressed in the axial direction against a surface of the inner circumferential surface of the rack housing facing the opening side.

The surface of the inner circumferential surface of the rack housing facing the opening side may be configured by an inner side surface of the pair of inner side surfaces of the engaging concave portion located on the back side of the rack housing, and the surface of the at least one slide bearing facing the back side of the rack housing may be configured by an outer side surface of the pair of outer side surfaces of the engaging convex portion facing the back side of the rack housing.

The inner side surface of the pair of inner side surfaces of the engaging concave portion that is located on the back side of the rack housing may include a concave portion second inclined surface that is inclined in a direction toward the opening side of the rack housing while going outword in the radial direction, and the outer side surface of the pair of outer side surfaces of the engaging convex portion that faces the concave portion second inclined surface in the axial direction, and faces the back side of the rack housing may be configured by a convex portion second inclined surface that is inclined in a direction toward the opening side of the rack housing while going outward in the radial direction. In this case, by pressing the convex portion first inclined surface toward the outer side in the radial direction against the concave portion first inclined surface, the convex portion second inclined surface may be pressed in the axial direction against the concave portion second inclined surface, and by pressing the convex portion second inclined surface toward the outer side in the radial direction against the concave portion second inclined surface, the convex portion first inclined surface may be pressed in the axial direction against the concave portion first inclined surface.

The inclination angle of the concave portion first inclined surface with respect to the central axis of the rack housing may be the same as the inclination angle of the convex portion first inclined surface with respect to the central axis of the slide bearing, and the inclination angle of the concave portion second inclined surface with respect to the central axis of the rack housing may the same as the inclination angle of the convex portion second inclined surface with respect to the central axis of the slide bearing.

Alternatively, the inclination angle of the concave portion first inclined surface with respect to the central axis of the rack housing may be larger than the inclination angle of the convex portion first inclined surface with respect to the central axis of the slide bearing, and the inclination angle of the concave portion second inclined surface with respect to the central axis of the rack housing may be larger than the inclination angle of the convex portion second inclined surface with respect to the central axis of the slide bearing.

The inclination angle of the concave portion second inclined surface with respect to the central axis of the rack housing may be smaller than the inclination angle of the concave portion first inclined surface with respect to the central axis of the rack housing.

The cross-sectional shape of the concave portion first inclined surface and the convex portion first inclined surface, and the cross-sectional shape of the concave portion second inclined surface and the convex portion second inclined surface may be linear.

Alternatively, the cross-sectional shape of the concave portion first inclined surface and the concave portion second inclined surface may be a concave arc shape, and the cross-sectional shape of the convex portion first inclined surface and the convex portion second inclined surface may be a convex arc shape.

The at least one slide bearing may include a rack bush in which the tubular body and the entire engaging convex portion are integrally formed.

Alternatively, the at least one slide bearing may include a rack bush having the tubular body, and a snap ring (retaining ring) having at least a portion of the engaging convex portion having the convex portion first inclined surface. In this case, the entire engaging convex portion may be configured by the snap ring.

The at least one slide bearing may be arranged in a portion of the rack housing in a vicinity of an opening portion on the side far from an engaging portion between the rack teeth and the pinion teeth in the axial direction.

In this case, the at least one slide bearing may be configured by a pair of slide bearings; and the pair of slide bearings may be arranged in portions of the rack housing in the vicinity of the opening portions on both sides in the axial direction.

The rack and pinion type steering gear unit may further include a pressing mechanism that presses a pressed portion of the outer circumferential surface of the rack shaft that is located on the side in the radial direction opposite to the portion provided with the rack teeth toward the pinion shaft.

In this case, the pressing mechanism may include a pivot shaft that is supported so as to be able to move away from or near to the rack shaft; a pressing roller rotatably supported around the pivot shaft, the outer circumferential surface of the pressing roller slidably contacting with the pressed portion; and an elastic member that presses the pivot shaft toward the pinion shaft.

Alternatively, the pressing mechanism may include a rack guide that is arranged so as to be able to move away from or near to the rack shaft, the tip end portion of the rack guide slidably contacting with the pressed portion; and an elastic member that presses the rack guide toward the pinion shaft.

In either case, the pressing mechanism may be housed inside a cylinder portion that is provided in the housing.

Advantageous Effects of Invention

With the rack and pinion type steering gear unit of the present invention, a slide bearing that slidably supports a rack shaft may be supported without any looseness in the axial direction with respect to a rack housing without being held in the axial direction between two members.

BRIEF DESCRIPTION OF DRAWINGS

FIG. 13A is a front view illustrating a snap ring constituting a slide bearing together with a rack bush, that is removed from a rack and pinion type steering apparatus according to the fourth example; and FIG. 13B is a side view as seen from the right side of FIG. 13A.

DESCRIPTION OF EMBODIMENTS

First Example

A first example of an embodiment will be described with reference to FIGS. 1 to 7. Note that in the following description, the front-rear direction means the front-rear direction of a vehicle, the up-down direction means the up-down direction of the vehicle, and the left-right direction means the width direction of the vehicle.

Figure 1:
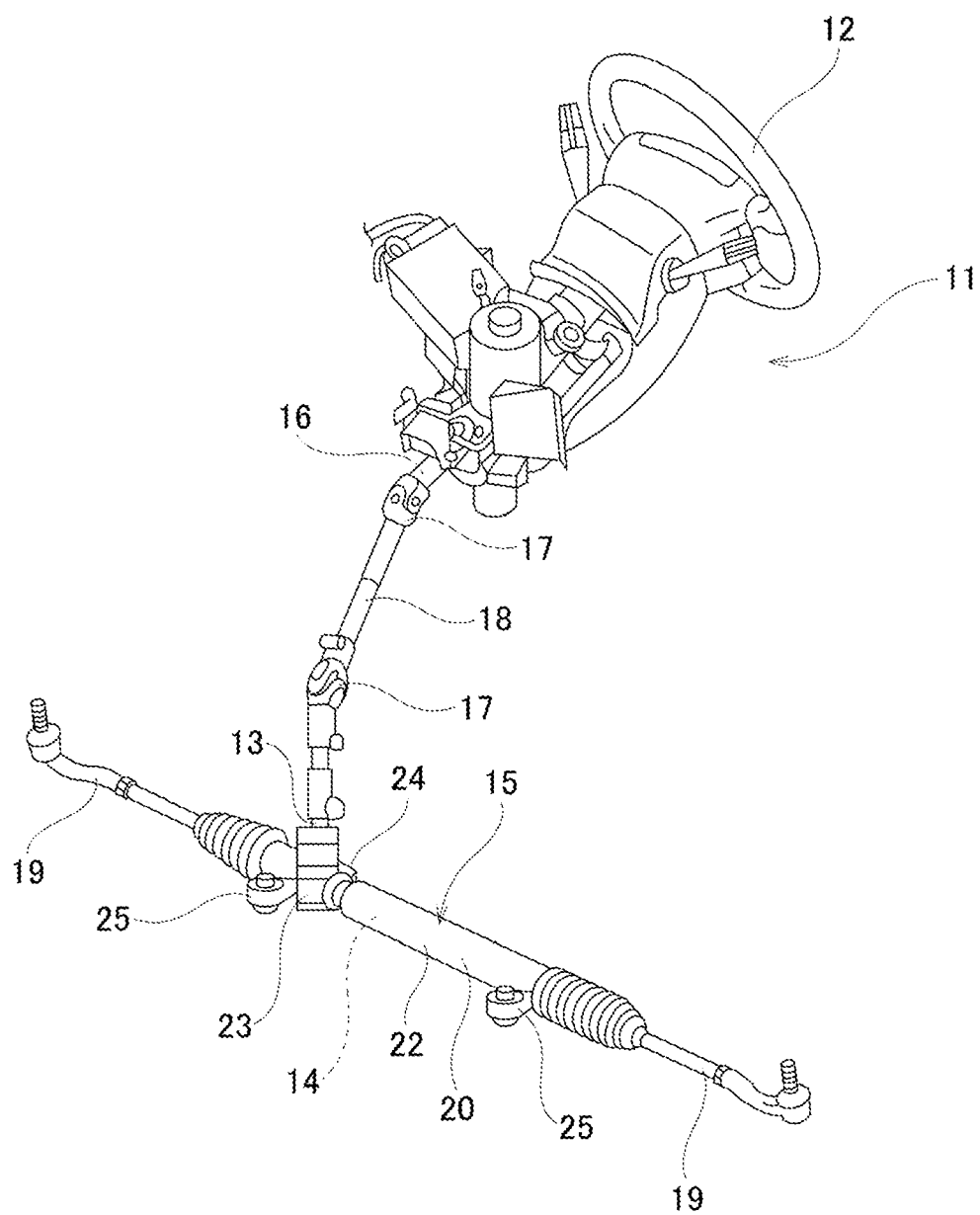
FIG. 1 is a perspective view illustrating a steering apparatus including a rack and pinion type steering gear unit according to a first example of an embodiment of the present invention.

In the overall configuration as illustrated in FIG. 1, the steering apparatus 11 converts the rotational movement of the steering wheel 12 operated by the driver to reciprocating linear movement by a rack and pinion type steering gear unit 15 having a pinion shaft 13 and a rack shaft 14, and thereby applies a desired steering angle to the left and right steered wheels (not illustrated). The steering wheel 12 is fixed to the rear end portion of a steering shaft 16. The front end portion of the steering shaft 16 is connected to the base end portion of the pinion shaft 13 via a pair of universal joints 17 and an intermediate shaft 18. A pair of tie rods 19 connected to the left and right steered wheels is connected to the end portions on both sides in the axial direction of the rack shaft 14 that engages with the pinion shaft 13.

Figure 2:
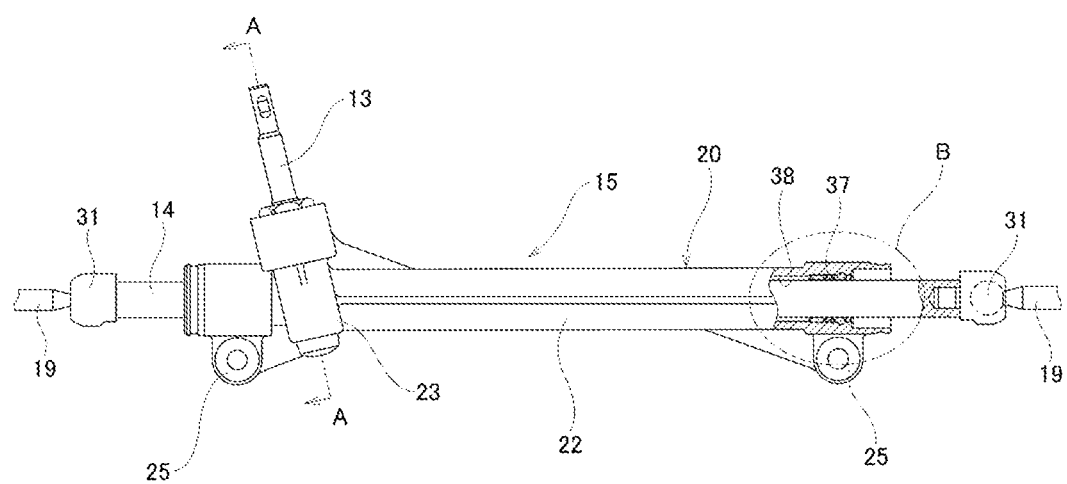
FIG. 2 is a partial cross-sectional view illustrating the rack and pinion type steering gear unit according to the first example.
Figure 3:
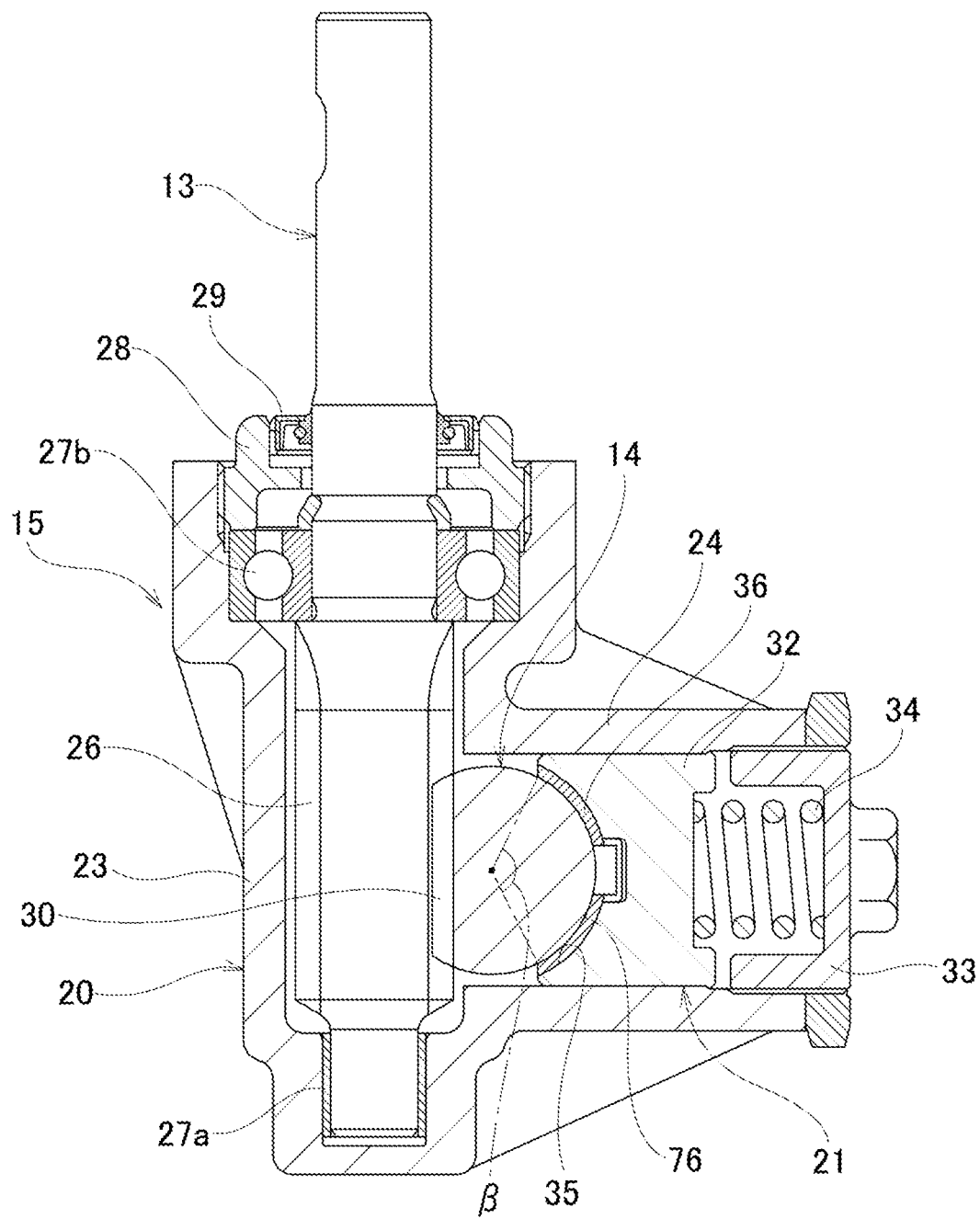
FIG. 3 is a cross-sectional view taken along the line A-A of FIG. 2.
Figure 4:
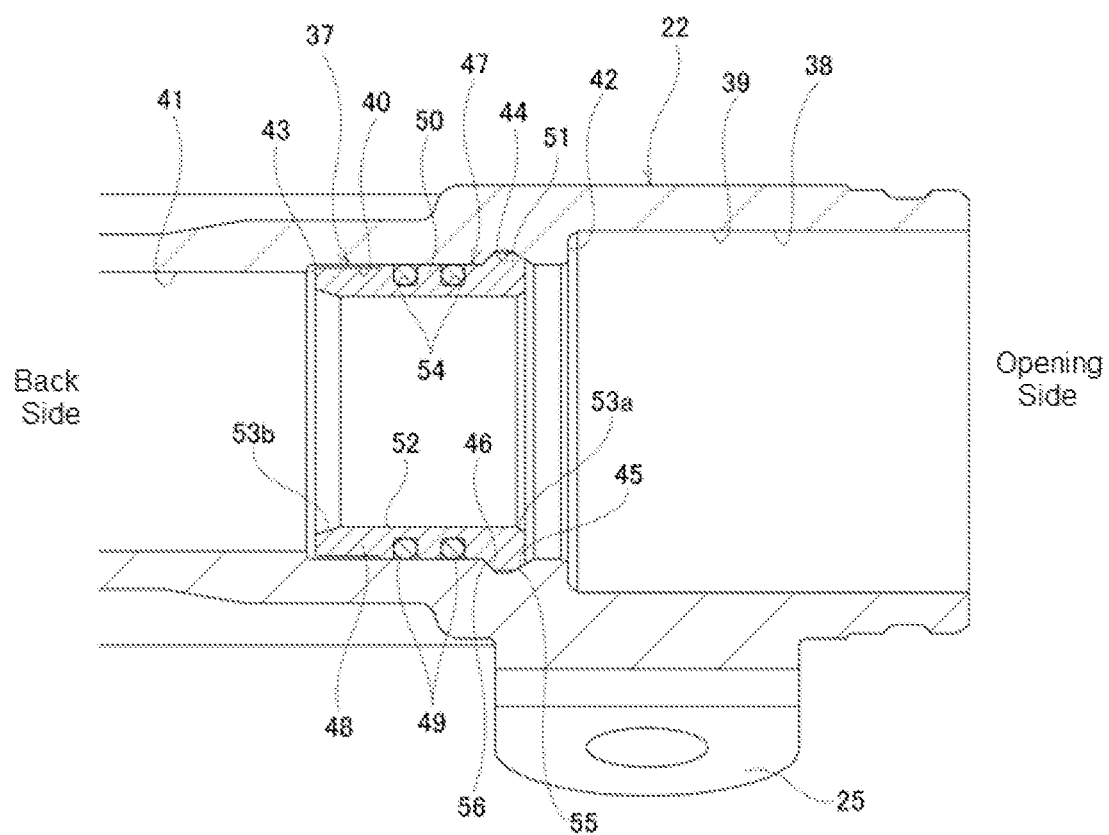
FIG. 4 is an enlarged view of part B of FIG. 2, and is an illustration with the rack shaft omitted.
Figure 5:
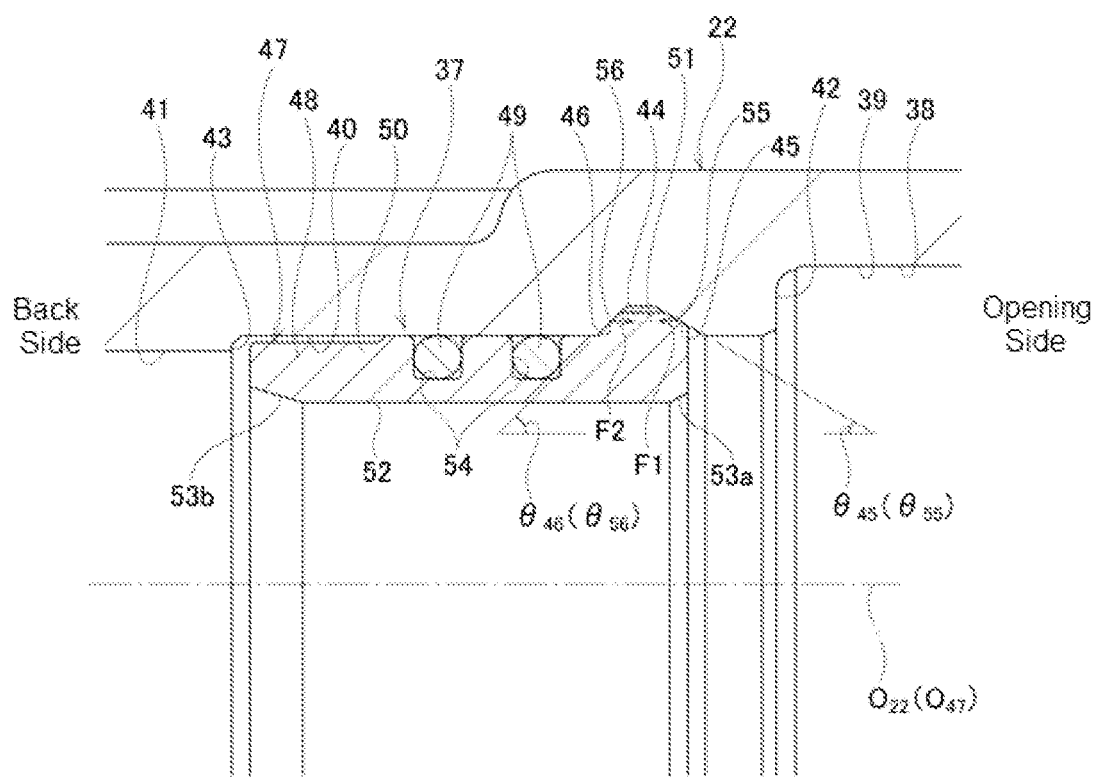
FIG. 5 is an enlarged view of the upper portion in FIG. 4.
Figure 6:
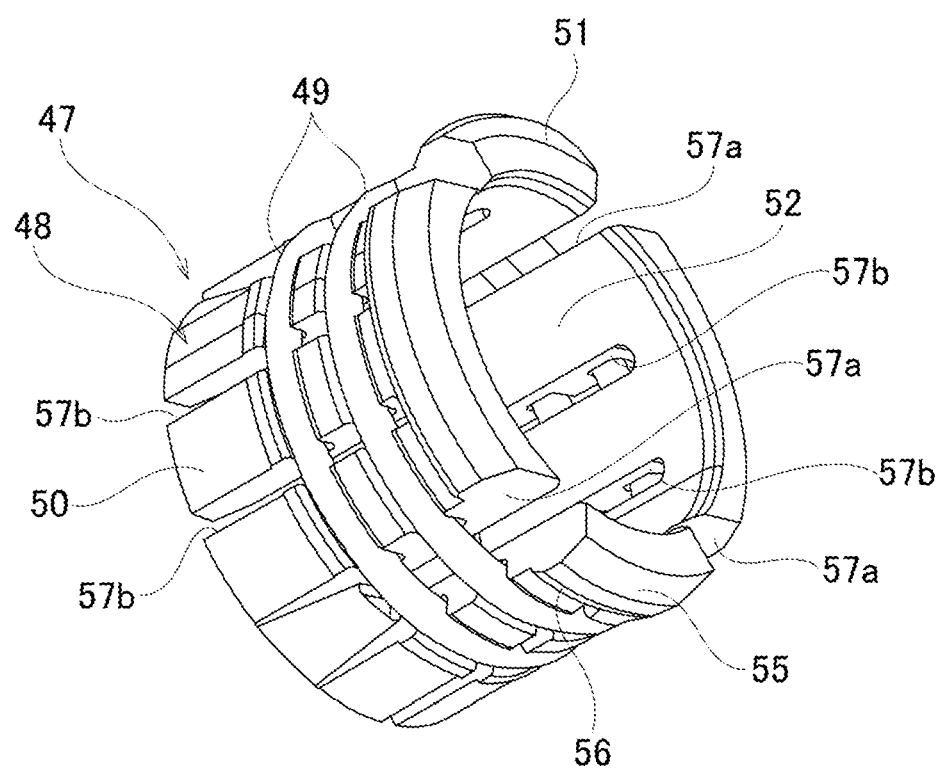
FIG. 6 is a perspective view illustrating a rack bush that is removed from the rack and pinion type steering gear unit according to the first example.
Figure 7:
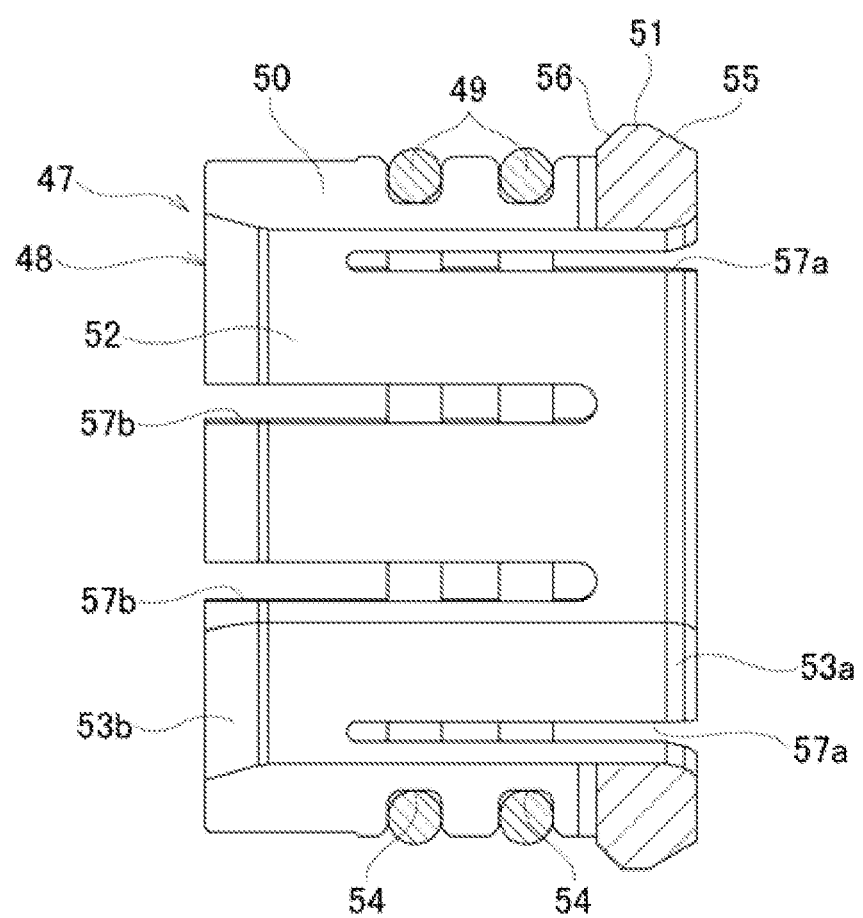
FIG. 7 is a perspective view illustrating the rack bush that is removed from the rack and pinion type steering gear unit according to the first example.

As illustrated in FIGS. 2 and 3, the steering gear unit 15 includes a housing 20, a pinion shaft 13, a rack shaft 14, and a pressing mechanism 21.

The housing 20 may be fixed to a vehicle body and includes a rack housing 22 that houses the intermediate portion in the axial direction of the rack shaft 14, a pinion housing 23 that houses the front half portion of the pinion shaft 13, a cylinder portion 24 that houses the pressing mechanism 21, and a pair of mounting flange portions 25 for fixing the housing 20 to the vehicle body. The housing 20 is integrally formed by die cast molding a light alloy such as an aluminum alloy. The internal space of the rack housing 22, the internal space of the pinion housing 23, and the internal space of the cylinder portion 24 communicate with each other.

The rack housing 22 has a cylindrical shape extending in the left-right direction, and both sides in the axial direction located on both the left and right sides are open. The rack housing 22 is arranged so as to extend substantially horizontally and in the width direction of the vehicle.

The pinion housing 23 has a bottomed cylindrical shape, and only the upper end is open. The pinion housing 23 is arranged at a position that is on the front side of the rack housing 22 (on the left side in FIG. 3) and biased toward one side (left side in FIG. 2) in the axial direction of the rack housing 22. The pinion housing 23 is arranged at a skew position with respect to the rack housing 22. In other words, the central axis of the pinion housing 23 and the central axis of the rack housing 22 are on skew lines. Moreover, when viewed from the front-rear direction, the central axis of the pinion housing 23 is not arranged in a direction orthogonal to the central axis of the rack housing 22, but is arranged so as to be inclined with respect to the orthogonal direction.

The cylinder portion 24 has a substantially cylindrical shape. The cylinder portion 24 is arranged on the rear side of the rack housing 22 (on the right side in FIG. 3) and at a position biased toward the one side in the axial direction of the rack housing 22. More specifically, the cylinder portion 24 is arranged at the same position as the pinion housing 23 with respect to the axial direction of the rack housing 22. The cylinder portion 24 extends in the front-rear direction in the direction orthogonal to the rack housing 22. Therefore, the central axis of the cylinder portion 24 is arranged in a direction orthogonal to the central axis of the rack housing 22.

A pair of mounting flange portions 25 are arranged on the front side of the rack housing 22 so as to be separated from each other in the axial direction of the rack housing 22. The housing 20 is fixed to the vehicle body by fixing members such as bolts, studs or the like that are inserted through each of the mounting flange portions 25.

The pinion shaft 13 has pinion teeth 26 at a portion that is near the tip end of the outer circumferential surface thereof. The pinion shaft 13 is such that the first half portion thereof is arranged on the inside of the pinion housing 23, and is supported by a pair of bearings 27a, 27b so as only to be able to rotate with respect to the pinion housing 23. More specifically, the tip end portion of the pinion shaft 13 is rotatably supported by the slide bearing 27a with respect to the back side portion of the pinion housing 23, and the intermediate portion of the pinion shaft 13 is rotatably supported by a single-row rolling bearing (ball bearing) 27b such as a deep groove type, a three-point contact type, a four-point contact type or the like so as to be able to rotate with respect to a portion near the opening of the pinion housing 23. A retaining screw cylinder 28 is screwed into the opening end of the pinion housing 23 to regulate the position in the axial direction of the rolling bearing 27b. A gap between the inner circumferential surface of the retaining screw cylinder 28 and the outer circumferential surface of the pinion shaft 13 is closed by a seal ring 29.

The rack shaft 14 is made of metal such as carbon steel, stainless steel or the like and has rack teeth 30 at positions biased toward the one side in the axial direction on the front surface. The outer circumferential surface of the rack shaft 14 is configured by a cylindrical surface except for a portion provided with the rack teeth 30. In other words, the portions of the rack shaft 14 that deviate from the rack teeth 30 in the axial direction have a circular cross-sectional shape, and the portion of the rack shaft 14 that overlaps the rack teeth 30 in the axial direction has a bow-shaped cross-sectional shape. The rack shaft 14 is arranged inside the rack housing 22 so as to be able to move back-and-forth in the axial direction, and the rack teeth 30 engage with the pinion teeth 26. The end portions of the rack shaft 14 on both sides in the axial direction project from the opening portions of the rack housing 22 and are connected to the base end portion of the tie rods 19 via the spherical joints 31. The tip end portions of the tie rods 19 are pivotally supported by the tip end portions of knuckle arms (not illustrated). Note that the rack shaft 14 does not rotate around its own central axis due to the engagement between the pinion teeth 26 and the rack teeth 30.

The pressing mechanism 21 presses the pressed portion 76 provided on the rear surface of the outer circumferential surface of the rack shaft 14 that is located on the opposite side in the radial direction from the front surface provided with the rack teeth 30 toward the pinion shaft 13. The pressing mechanism 21 of this example includes a rack guide 32 arranged inside the cylinder portion 24, a cover 33 that is screwed into the opening portion of the cylinder portion 24, and a coil spring 34 arranged between the rack guide 32 and the cover 33. The rack guide 32 is arranged inside the cylinder portion 24 so as to be able to move in the front-rear direction, which is the axial direction of the cylinder portion 24, or in other words, so as to be able to move far or near with respect to the pinion shaft 13. The rack guide 32 has a substantially cylindrical shape, and on the front end surface facing the back surface (pressed portion 76) of the rack shaft 14, has a pressing concave portion 35 having a partially cylindrical concave surface that matches the shape of the rear surface (pressed portion 76) of the rack shaft 14 in order to slidably support the rack shaft 14. Note that a synthetic resin sheet 36 having excellent slidability is attached to the surface of the pressing concave portion 35.

The pressing mechanism 21, by elastically pressing the rack shaft 14 toward the pinion shaft 13, eliminates backlash in the engaging portion between the pinion teeth 26 and the rack teeth 30. Furthermore, regardless of the force in the direction away from the pinion shaft 13 that is applied to the rack shaft 14 due to the power transmission at the engaging portion, the engaged state of the pinion teeth 26 and the rack teeth 30 is properly maintained.

The steering gear unit 15 of this example, in order to support the rack shaft 14 inside the rack housing 22 so as to be able to smoothly displace in the axial direction, includes a pair of slide bearings 37 that are fitted in the portions near each of the opening portions on both sides in the axial direction of the rack housing 22. In the steering gear unit 15 of this example is configured such that by slidably supporting the outer circumferential surface of the rack shaft 14 by the inner circumferential surface of the pair of slide bearings 37, the rack shaft 14 is able to be displace in the axial direction with respect to the rack housing 22 without looseness.

Hereinafter, the structure of the portion of the rack housing 22 into which the pair of slide bearings 37 are internally fitted and the structure of the slide bearing 37 will be described in detail with reference to FIGS. 4 to 7. Note that both sides in the axial direction (left and right sides) of the rack housing 22 correspond to the opening sides of the rack housing 22, and the central side in the axial direction of the rack housing 22 corresponds to the back side of the rack housing 22. Moreover, the structures of the pair of slide bearings 37 and the structure of the portion of the rack housing 22 in which the slide bearings 37 are fitted are symmetrical with respect to the axial direction (left-right direction), so only the structure of the slide bearing 37 on the side (right side in FIG. 2) far from the engagement portion between the pinion teeth 26 and the rack teeth 30 in the axial direction, and the structure of the portion of the rack housing 22 in which the slide bearing 37 on the side far from the engaging portion is internally fitted will be described.

On the inner circumferential surface of the end portion in the axial direction of the rack housing 22, there is a rack insertion hole 38 that is a stepped hole for inserting the rack shaft 14. The rack insertion hole 38 includes a large-diameter opening hole portion 39 at the end portion on the opening side, and a support hole portion 40 having an inner diameter smaller than the inner diameter of the opening hole portion 39 at a portion adjacent to the back side of the opening hole portion 39. The rack housing 22 includes a central hole portion 41 having an inner diameter smaller than the inner diameter of the support hole portion 40 in a portion of the inner circumferential surface adjacent to the back side of the support hole portion 40. Furthermore, the rack housing 22 is such that in the rack insertion hole 38 there is a large-diameter stepped surface 42 that faces the opening side of the rack housing 22 between the opening hole portion 39 and the support hole portion 40, and there is a small-diameter stepped surface 43 facing the opening side of the rack housing 22 between the support hole 40 and the central hole portion 41.

The support hole portion 40 is a portion in which the slide bearing 37 is internally fitted and supported, and includes an engaging concave portion 44 around the entire circumference in a portion of the inner circumferential surface near the opening. The engaging concave portion 44 has a substantially trapezoidal cross-sectional shape in which the width in the axial direction is narrower at the back portion on outer side in the radial direction than the width in the axial direction of the opening portion on the inner side in the radial direction. The inner circumferential surface of the support hole portion 40 is formed of a cylindrical surface having a constant inner diameter except for the portion where the engaging concave portion 44 is provided.

The engaging concave portion 44 has a concave portion first inclined surface 45 on the inner side surface of the pair of inner side surfaces facing each other in the axial direction that is positioned on the opening side of the rack housing 22 that is inclined in a direction toward the back side of the rack housing 22 while going outward in the radial direction, and has a concave portion second inclined surface 46 on the inner surface that is positioned on the back side of the rack housing 22 that is inclined in a direction toward the opining side of the rack housing 22 while going outward in the radial direction. Therefore, a gap in the axial direction between the concave portion first inclined surface 45 and the concave portion second inclined surface 46 becomes smaller going outword in the radial direction (the back side of the engaging concave portion 44). The concave portion first inclined surface 45 is configured by a partial conical concave surface having a linear generatrix shape, and the concave portion second inclined surface 46 is formed of a partial conical concave surface having a linear generatrix shape. The bottom surface (inner circumferential surface) of the engaging concave portion 44 is configured by a cylindrical surface.

The inclination angle $\theta_{46}$ of the concave portion second inclined surface 46 with respect to the central axis $O_{22}$ of the rack housing 22 is smaller than the inclination angle $\theta_{45}$ of the concave portion first inclined surface 45 with respect to the central axis $O_{22}$ of the rack housing 22 ($\theta_{46}<\theta_{45}$). More specifically, the inclination angle $\theta_{46}$ of the concave portion second inclined surface 46 with respect to the central axis $O_{22}$ of the rack housing 22 is, for example, within the range 5 degrees to 70 degrees, and is 45 degrees in the illustrated example. On the other hand, the inclination angle $\theta_{45}$ of the concave portion first inclined surface 45 with respect to the central axis $O_{22}$ of the rack housing 22 is, for example, within the range 5 degrees to 70 degrees, and is 30 degrees in the illustrated example. Along with this, in the illustrated example, the width in the axial direction of the concave portion first inclined surface 45 is larger than the width in the axial direction of the concave portion second inclined surface 46.

The slide bearing 37 is composed of only the rack bush 47. The rack bush 47 includes a rack bush main body 48 and a pair of elastic rings 49 fitted around the outside of the rack bush main body 48.

The rack bush main body 48 is integrally formed of an elastic synthetic resin such as a polyacetal resin, a polyamide resin, a polyethylene resin, a tetrafluoroethylene resin or the like. More specifically, the rack bush main body 48 includes a tubular body 50 having a substantially cylindrical shape that is integrated with the entire outward flange-shaped engaging convex portion 51 that projects further outward in the radial direction than the outer circumferential surface of the tubular body 50. In other words, the rack bush main body 48 is composed of an integrally molded product obtained by injection molding a synthetic resin.

The tubular body 50 has a cylindrical guide surface 52 for slidably supporting the outer circumferential surface of the rack shaft 14 on the inner circumferential surface of the intermediate portion in the axial direction, and has tapered surfaces 53a, 53b, the inner diameters of which increase as the distance from the guide surface 52 increases, on the inner circumferential surfaces of the end portions on both sides in the axial direction. The tapered surfaces 53a, 53b are provided in order to ensure the air permeability inside the rack housing 22 and to improve the insertability of the rack shaft 14. The tubular body 50 has a pair of locking grooves 54 for locking the elastic rings 49 at two positions on the outer circumferential surface separated in the axial direction. The locking grooves 54 have a substantially rectangular cross-sectional shape.

The engaging convex portion 51 is provided at an end portion of the rack bush main body 48 located on the opening side of the rack housing 22, and in a state in which the rack bush 47 is internally fitted into the support hole portion 40 of the rack housing 22, is arranged inside the engaging concave portion 44. The engaging convex portion 51 has a substantially trapezoidal cross-sectional shape, and the amount of protrusion in the radial direction from the outer circumferential surface of the tubular body 50 is smaller than the groove depth of the engaging concave portion 44. Therefore, when the engaging convex portion 51 is arranged inside the engaging concave portion 44, the top surface (outer circumferential surface) of the engaging convex portion 51 does not come into contact with the bottom surface of the engaging concave portion 44.

The engaging convex portion 51 has a convex portion first inclined surface 55 on the outer side surface of the pair of outer side surfaces of the outer surface that faces the concave portion first inclined surface 45 of the engaging concave portion 44 in the axial direction that is inclined in a direction toward the back side of the rack housing 22 while going toward the outside in the radial direction, and has a convex portion second inclined surface 56 on the outer side that faces the concave portion second inclined surface 46 of the engaging concave portion 44 in the axial direction that is inclined in a direction toward the opening side of the rack housing 22 while going outward in the radial direction. The top surface of the engaging convex portion 51 is configured by a cylindrical surface. Therefore, the engaging convex portion 51 has a tapered shape in which the width in the axial direction becomes smaller going outward in the radial direction. The convex portion first inclined surface 55 and the convex portion second inclined surface 56 are configured by a partial conical convex surface having a linear cross-sectional shape.

The inclination angle $\theta_{55}$ of the convex portion first inclined surface 55 with respect to the central axis $O_{47}$ ($=O_{22}$) of the rack bush 47 is the same as the inclination angle $\theta_{45}$ of the concave portion first inclined surface 45 ($\theta_{55}=\theta_{45}$). Moreover, the inclination angle $\theta_{56}$ of the convex portion second inclined surface 56 with respect to the central axis $\theta_{47}$ of the rack bush 47 is the same as the inclination angle $\theta_{46}$ of the concave portion second inclined surface 46 ($\theta_{56}=\theta_{46}$).

The rack bush main body 48 includes a plurality of first axial slits 57a formed from the end portion of the opening side of the rack housing 22 to the intermediate portion in the axial direction and arranged at intervals in the circumferential direction, and a plurality of second axial slits 57b formed from the end portion of the back side of the rack housing 22 to the intermediate portion in the axial direction and arranged at intervals in the circumferential direction. In the illustrated example, the rack bush main body 48 includes four first axial slits 57a and eight second axial slits 57b. As a result, the rack bush main body 48 is configured so as to be able to expand and contract in the radial direction. The tubular body 50 and the engaging convex portion 51 of the rack bush main body 48 are discontinuous in the circumferential direction at the portions where the first axial slits 57a and the second axial slits 57b are located.

The elastic rings 49 are made of an elastic material such as natural rubber, synthetic rubber, a thermoplastic synthetic resin having elasticity, or the like, and have a circular cross-sectional shape in a free state like an O-ring. In the free state, the elastic rings 49 have an outer diameter larger than the inner diameter of the support hole portion 40 of the rack housing 22 and an inner diameter smaller than the outer diameter of the bottom surface of the locking grooves 54 of the rack bush main body 48. The elastic rings 49 have a wire diameter larger than the groove depth of the locking grooves 54 in the free state. The elastic rings 49 are locked in the locking grooves 54 of the rack bush main body 48 and externally fitted elastically around the rack bush main body 48 so as to cross the first axial slits 57a and the second axial slits 57b.

In order to assemble the rack bush 47 in the rack housing 22, first, by locking the elastic rings 49 in the locking grooves 54 of the rack bush main body 48, the widths in the circumferential direction of the first axial slits 57a and the second axial slit 57b are reduced, and the diameter of the rack bush main body 48 is reduced. Next, with diameter of the rack bush 47 in a further reduced state, the rack bush 47 is inserted into the rack insertion hole 38 of the rack housing 22 using a specified jig. When doing this, the insertion direction of the rack bush 47 is restricted so that the engaging convex portion 51 is located on the rear side in the insertion direction of the rack bush 47.

After the rack bush 47 has been inserted to a point where the engaging convex portion 51 is located on the inner diameter side of the engaging concave portion 44, the jig is removed from the rack bush 47 and the diameter of the rack bush 47 is expanded. As a result, the engaging convex portion 51 is made to enter inside of the engaging concave portion 44. At this time, the elastic restoring force of the rack bush main body 48 presses the convex portion first inclined surface 55 of the engaging convex portion 51 outward in the radial direction against the concave portion first inclined surface 45 of the engaging concave portion 44, and presses the convex portion second inclined surface 56 of the engaging convex portion 51 outward in the radial direction against the concave portion second inclined surface 46 of the engaging concave portion 44.

After that, by inserting the rack shaft 14 inside the rack bush 47 (rack bush main body 48), the diameter of the rack bush 47 is further expanded. As a result, the pressing force of the convex portion first inclined surface 55 against the concave portion first inclined surface 45 toward the outside in the radial direction is increased, and the pressing force of the convex portion second inclined surface 56 on the concave portion second inclined surface 46 toward the outside in the radial direction is increased. Moreover, the elastic rings 49 are elastically compressed between the bottom surface of the locking grooves 54 and the inner circumferential surface of the support hole portion 40, and the intermediate portion in the axial direction of the outer circumferential surface of the rack bush main body 48 is elastically brought into contact with the inner circumferential surface of the support hole portion 40. Furthermore, the guide surface 52 provided on the inner circumferential surface of the rack bush main body 48 is elastically pressed against the outer circumferential surface of the rack shaft 14 to hold the rack shaft 14 without looseness. After that, the tie rods 19 are connected to the end portions on both sides in the axial direction of the rack shaft 14 via spherical joints 31.

With the steering gear unit 15 of this example, the rack bush 47 of the slide bearing 37 for slidably supporting the rack shaft 14 may be supported with respect to the rack housing 22 without any looseness in the axial direction even without being held in the axial direction between two members.

In other words, when the convex portion first inclined surface 55 of the engaging convex portion 51 is pressed outward in the radial direction with respect to the concave portion first inclined surface 45 of the engaging concave portion 44, a reaction force (component force) F1 facing the back side of the rack housing 22 acts on the rack bush 47 due to the concave portion first inclined surface 45 being inclined. Therefore, by utilizing the reaction force F1, the convex portion second inclined surface 56, which is a surface facing the back side of the rack housing 22, may be pressed in the axial direction against the concave portion second inclined surface 46, which is a surface facing the opening side of the rack housing 22. Moreover, when the convex portion second inclined surface 56 of the engaging convex portion 51 is pressed outward in the radial direction with respect to the concave portion second inclined surface 46 of the engaging concave portion 44, a reaction force (component force) F2 facing the opening side of the rack housing 22 acts on the rack bush 47 due to the concave portion second inclined surface 45 being inclined. Therefore, by utilizing the reaction force F2, the convex portion first inclined surface 55, which is the surface of the rack housing 22 facing the opening side, may be pressed in the axial direction against the concave portion first inclined surface 45, which is the surface facing the back side of the rack housing 22. In other words, the concave portion first inclined surface 45 of the engaging concave portion 44 is inclined, so when the convex portion first inclined surface 55 is pressed outward in the radial direction, the engaging convex portion 51 is guided along the concave portion first inclined surface 45 to the back side of the rack housing 22, so the convex portion second inclined surface 56 is pressed in the axial direction against the concave portion second inclined surface 46. Moreover, the concave portion second inclined surface 46 of the engaging concave portion 44 is inclined, so when the convex portion second inclined surface 56 is pressed outward in the radial direction, the engaging convex portion 51 is guided along the concave portion second inclined surface 46 to the opening side of the rack housing 22, so the convex portion first inclined surface 55 is pressed in the axial direction against the concave portion first inclined surface 45.

Therefore, the convex portion first inclined surface 55 and the convex portion second inclined surface 56 of the engaging convex portion 51 are stretched in the axial direction between the concave portion first inclined surface 45 and the concave portion second inclined surface 46 of the engaging concave portion 44. Therefore, the convex portion first inclined surface 55 and the concave portion first inclined surface 45 may be brought into contact with each other without a gap, and the convex portion second inclined surface 56 and the concave portion second inclined surface 46 may be brought into contact with each other without a gap, so the engaging convex portion 51 is able to engage with the engaging concave portion 44 without any looseness in the axial direction. As a result, the slide bearing 37 (rack bush 47) may be supported with respect to the rack housing 22 without any looseness in the axial direction without having to hold the slide bearing 37 (rack bush 47) between two members in the axial direction. Therefore, it is possible to effectively prevent the generation of abnormal noise due to looseness in the axial direction of the slide bearing 37.

When the rack shaft 14 slides in the axial direction, a force (friction force) in the axial direction acts on the slide bearing 37 from the rack shaft 14. However, in order to cause the slide bearing 37 to displace in the axial direction when a force acts in the axial direction from the rack shaft 14, it is necessary to deform the engaging convex portion 51 toward the inner diameter side along the concave portion first inclined surface 45 or the concave portion second inclined surface 46 against the elastic restoring force of the rack bush main body 48. Therefore, it is possible to effectively prevent the slide bearing 37 from being displaced in the axial direction relative to the rack housing 22.

The inclination angle $\theta_{55}$ of the convex portion first inclined surface 55 and the inclined angle $\theta_{45}$ of the concave portion first inclined surface 45 are the same, and the inclined angle $\theta_{56}$ of the convex portion second inclined surface 56 and the inclined angle $\theta_{46}$ of the concave portion second inclined surface 46 are the same. Therefore, the convex portion first inclined surface 55 and the concave portion first inclined surface 45 may be brought into surface contact with each other, and the convex portion second inclined surface 56 and the concave portion second inclined surface 46 may be brought into surface contact with each other. Therefore, the contact state between the convex portion first inclined surface 55 and the concave portion first inclined surface 45 and the contact state between the convex portion second inclined surface 56 and the concave portion second inclined surface 46 may be stabilized, and it is possible to effectively prevent looseness in the axial direction of the engaging convex portion 51 with respect to the engaging concave portion 44. Moreover, of the pair of inner side surfaces of the engaging concave portion 44, the inner side surface located on the opening side of the rack housing 22 includes the concave portion first inclined surface 45, so when the slide bearing 37 is removed from the rack housing 22, the engaging convex portion 51 is reduced in diameter by using the concave portion first inclined surface 45. Therefore, the slide bearing 37 may be removed from the rack housing 22 simply by pulling the slide bearing 37 out in the axial direction.

In the steering apparatus 11 of this example, when the steering wheel 12 is steered to the steering limit, the spherical joints 31 (the sockets thereof) connected to the end portions on both sides in the axial direction of the rack shaft 14 collide with the large-diameter stepped surface 42 of the rack housing 22 directly or via an annular stopper member (not illustrated). Therefore, even during of so-called end contact, a large axial load force does not act on the slide bearing 37. Accordingly, this is also advantageous from the aspect of stabilizing the posture of the slide bearing 37.

Second Example

Figure 8:
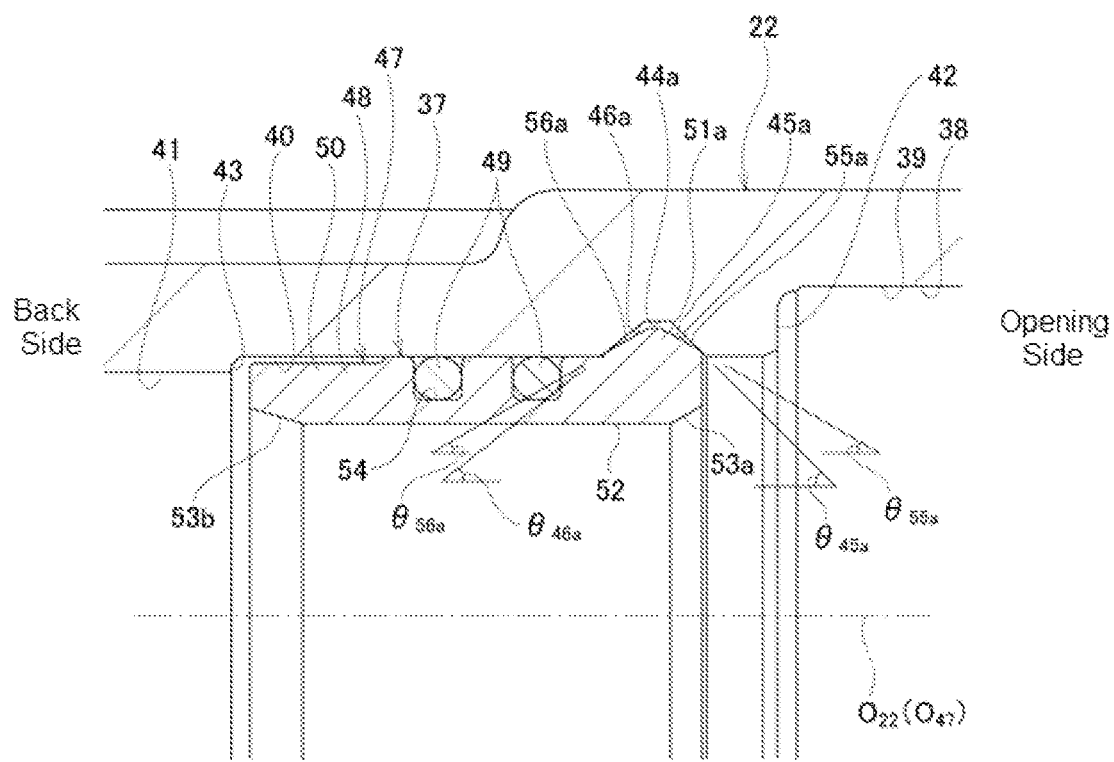
FIG. 8 is a diagram corresponding to FIG. 5, and illustrates a second example of an embodiment of the present invention.

A second example of an embodiment of the present invention will be described with reference to FIG. 8.

This example is a modified example of the first example. In this example, the inclination angle $\theta_{45a}$ of the concave portion first inclined surface 45a provided on the inner side surface of the pair of inner side surfaces of the engaging concave portion 44a located on the opening side of the rack housing 22 is larger than the inclination angle $\theta_{55a}$ of the convex portion first inclined surface 55a provided on the outer side surface of the pair of outer side surfaces of the engaging convex portion 51a facing the concave portion first inclined surface 45a in the axial direction ($\theta_{45a} > \theta_{55a}$). Moreover, the inclination angle $\theta_{46a}$ of the concave portion second inclined surface 46a provided on the inner side surface of the pair of inner side surfaces of the engaging concave portion 44a located on the back side of the rack housing 22 is larger than the inclination angle $\theta_{56a}$ of the convex portion second inclined surface 56a provided on the outer side surface of the pair of outer side surfaces of the engaging convex portion 51a facing the concave portion second inclined surface 46a in the axial direction ($\theta_{46a} > \theta_{56a}$).

In the illustrated example, the inclination angle $\theta_{46a}$ of the concave portion 6 second inclined surface 46a is smaller than the inclination angle $\theta_{45a}$ of the concave portion first inclined surface 45a ($\theta_{46a} < \theta_{45a}$), and the inclination angle $\theta_{55a}$ of the convex portion first inclined surface 55a is the same as the inclination angle $\theta_{56a}$ of the convex portion second inclined surface 56a ($\theta_{55a} = \theta_{56a}$).

In this example, with the engaging convex portion 51a arranged inside the engaging concave portion 44a, the edge portion of the convex portion first inclined surface 55a of the engaging convex portion 51a is pressed outward in the radial direction against the concave portion first inclined surface 45a of the engaging concave portion 44a, and the edge portion of the convex portion second inclined surface 56a of the engaging convex portion 51a is pressed outward in the radial direction against the concave portion second inclined surface 46a of the engaging concave portion 44a. The convex portion first inclined surface 55a and the concave portion first inclined surface 45a are in linear contact, and the convex portion second inclined surface 56a and the concave portion second inclined surface 46a are in linear contact.

The convex portion first inclined surface 55a and the convex portion second inclined surface 56a of the engaging convex portion 51a are stretched in the axial direction between the concave portion first inclined surface 45a and the concave portion second inclined surface 46a of the engaging concave portion 44a. Therefore, the engaging convex portion 51a can be engaged with the engaging concave portion 44a without looseness in the axial direction. Therefore, the slide bearing 37 may be supported with respect to the rack housing 22 without any looseness in the axial direction.

In particular, in this example, the inclination angle $\theta_{45a}$ of the concave portion first inclined surface 45a is larger than the inclination angle $\theta_{55a}$ of the convex portion first inclined surface 55a ($\theta_{45a} > \theta_{55a}$), and the inclination angle $\theta_{46a}$ of the concave portion second inclined surface 46a is larger than the inclination angle $\theta_{56a}$ of the convex portion second inclined surface 56a ($\theta_{46a} > \theta_{56a}$). Therefore, the width in the axial direction of the top portion (outer portion in the radial direction) of the engaging convex portion 51a can be made sufficiently smaller than the width in the axial direction of the opening portion (inner portion in the radial direction) of the engaging concave portion 44a, and it becomes easy for the engaging convex portion 51a to be inserted inside of the engaging concave portion 44a. Furthermore, the amount of protrusion in the radial direction of the engaging convex portion 51a from the outer circumferential surface of the tubular body 50 may be suppressed, so the workability of the work of inserting the slide bearing 37 into the rack insertion hole 38 is improved.

Moreover, in this example, the inclination angle $\theta_{46a}$ of the concave portion second inclined surface 46a located on the back side of the rack housing 22 and facing the opening side of the rack housing 22 smaller than the inclination angle $\theta_{45a}$ of the concave portion first inclined surface 45a located on the opening side of the rack housing 22, so from this aspect as well, the workability of the work of inserting the slide bearing 37 into the rack insertion hole 38 is improved.

Other configurations and effects are the same as in the first example.

Third Example

Figure 9:
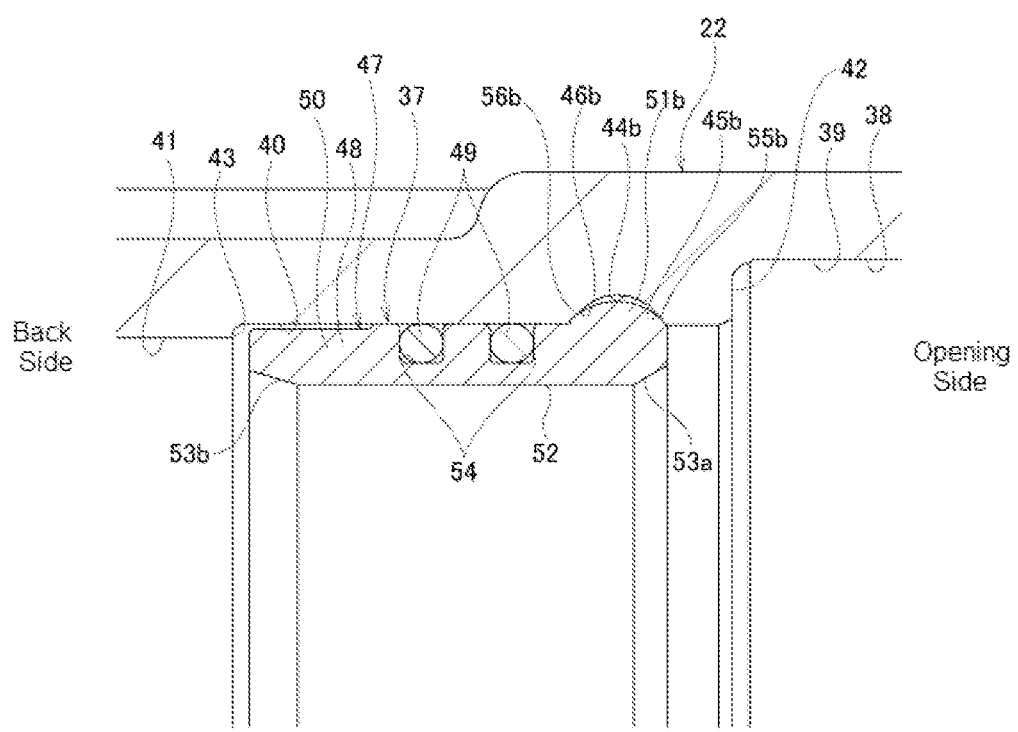
FIG. 9 is a diagram corresponding to FIG. 5, and illustrates a third example of an embodiment of the present invention.
Figure 10:
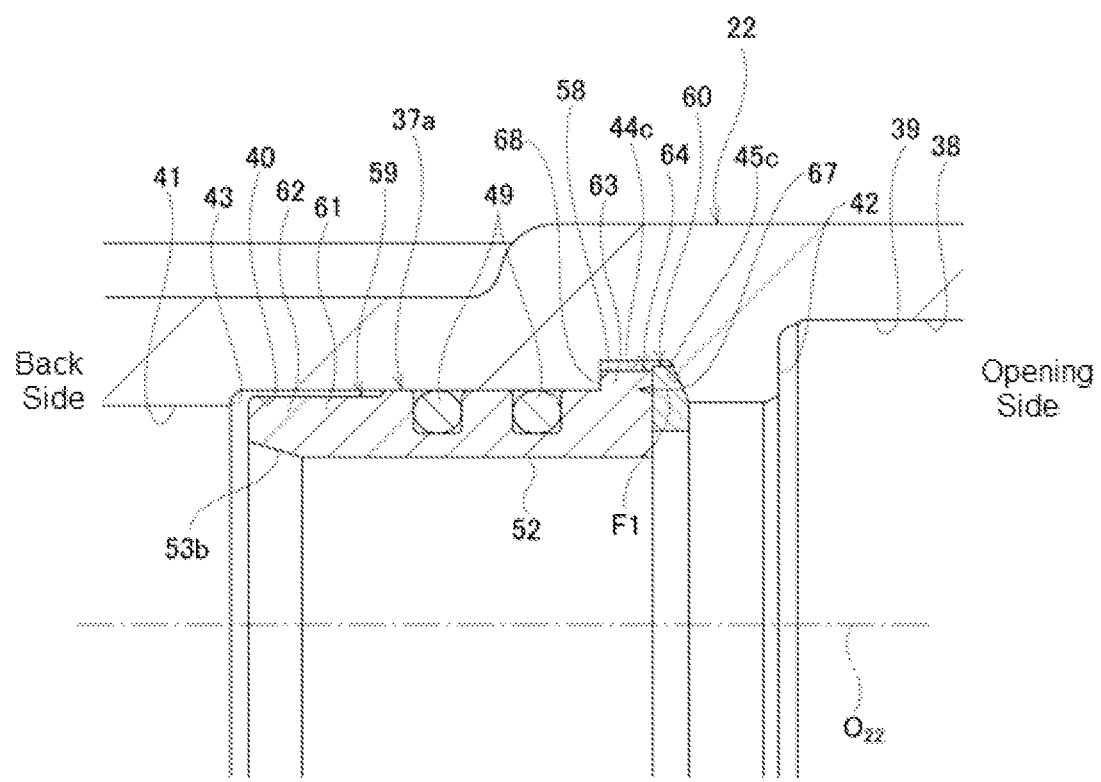
FIG. 10 is a diagram corresponding to FIG. 5, and illustrates a fourth example of an embodiment of the present invention.
Figure 11:
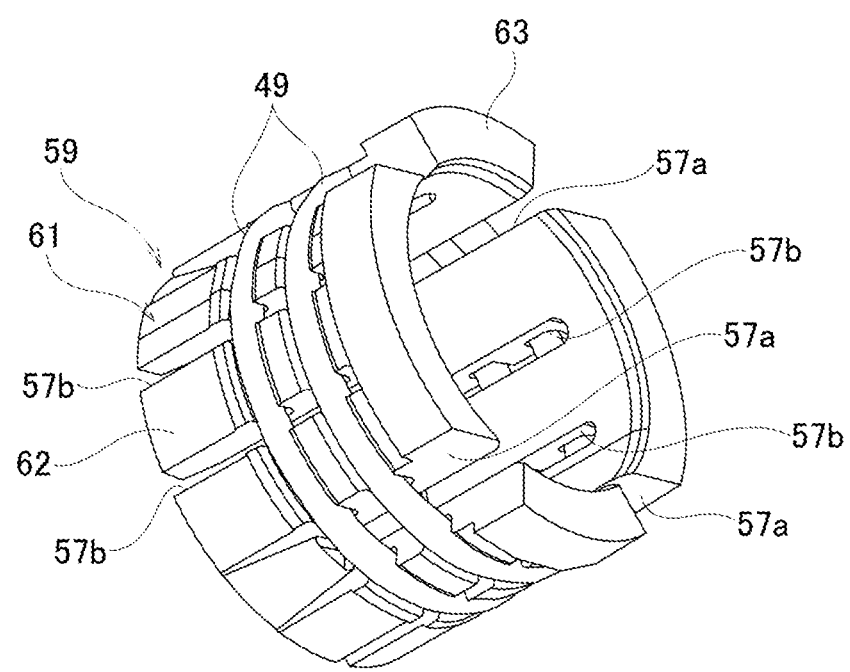
FIG. 11 is a diagram corresponding to FIG. 6, and illustrates the fourth example.
Figure 12:
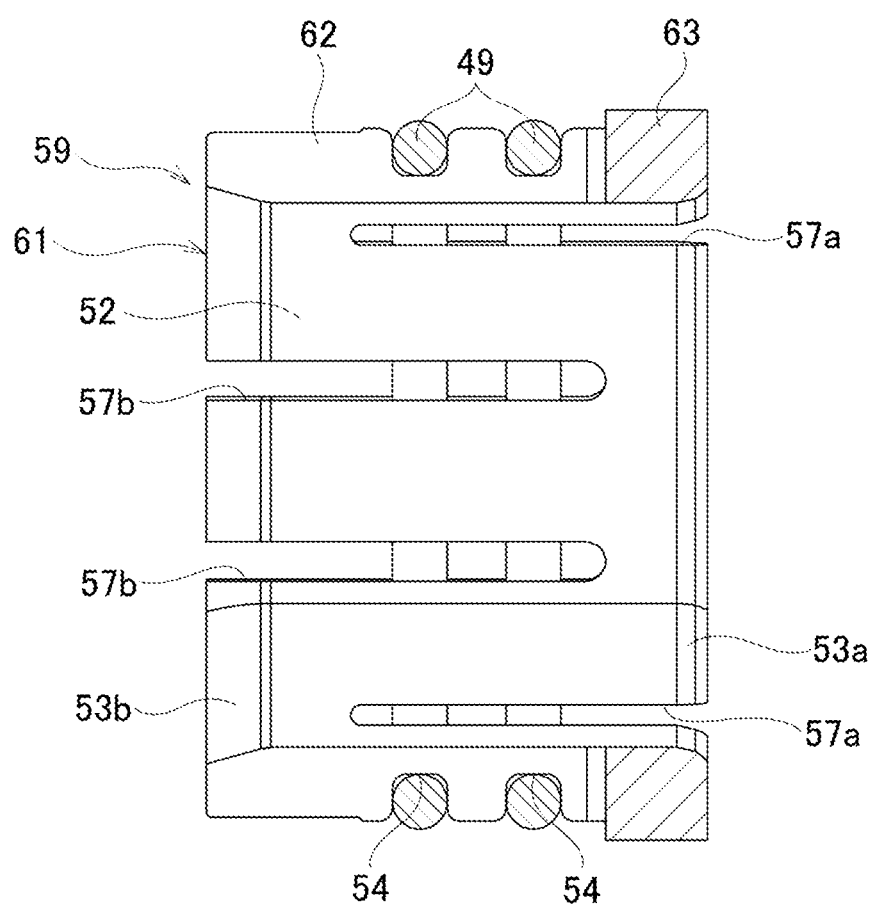
FIG. 12 is a diagram corresponding to FIG. 7, and illustrates the fourth example.

A third example of an embodiment of the present invention will be described with reference to FIG. 9.

This example is a modified example of the first example. In this example, the concave portion first inclined surface 45b and the concave portion second inclined surface 46b provided on the pair of inner side surfaces of the engaging concave portion 44b are each configured by a concave curved surface having a concave arc-shaped cross-sectional shape. The bottom surface of the engaging concave portion 44b has a concave arc-shaped cross-sectional shape (generatrix shape) having a radius of curvature smaller than that of the concave portion first inclined surface 45b and the concave portion second inclined surface 46b. Moreover, the convex portion first inclined surface 55b and the convex portion second inclined surface 56b provided on the pair of outer side surfaces of the engaging convex portion 51b are each configured by convex curved surfaces having a convex arc-shaped cross-sectional shape. The radius of curvature of the convex portion first inclined surface 55b is smaller than the radius of curvature of the concave portion first inclined surface 45b, and the radius of curvature of the convex portion second inclined surface 56b is smaller than the radius of curvature of the concave portion second inclined surface 46b. Note that, in the illustrated example, the cross-sectional shape of the entire outer surface including the top portion of the engaging convex portion 51b is configured by a convex arc shape having a single radius of curvature.

In this example, in a state where the engaging convex portion 51b is arranged inside the engaging concave portion 44b, the convex portion first inclined surface 55b of the engaging convex portion 51b is pressed outward in the radial direction against the concave portion first inclined surface 45b of the engaging concave portion 44b, and the convex portion second inclined surface 56b of the engaging convex portion 51b is pressed outward in the radial direction against the concave portion second inclined surface 46b of the engaging concave portion 44b. Therefore, the convex portion first inclined surface 55b and the convex portion second inclined surface 56b of the engaging convex portion 51b are stretched in the axial direction between the concave portion first inclined surface 45b and the concave portion second inclined surface 46b of the engaging concave portion 44b. Therefore, the engaging convex portion 51b can be engaged with the engaging concave portion 44b without any looseness in the axial direction. As a result, the slide bearing 37 may be supported with respect to the rack housing 22 without any looseness in the axial direction. The engaging convex portion 51b does not have a corner portion, so workability when inserting the slide bearing 37 into the rack insertion hole 38 may be improved.

Other configurations and effects are the same as in the first and second examples.

Fourth Example

A fourth example of an embodiment of the present invention will be described with reference to FIGS. 10 to 13.

In this example, the rack housing 22 has a concave portion first inclined surface 45c on the inner side surface of the pair of inner side surfaces of the engaging concave portion 44c provided on the inner circumferential surface that is located on the opening side of the rack housing 22 that is inclined in a direction toward the back side of the rack housing 22 while going outward in the radial direction, and has an annular flat surface 58 existing on a virtual plane orthogonal to the central axis $O_{22}$ of the rack housing 22 on the inner side surface located on the back side of the rack housing 22.

The slide bearing 37a for slidably supporting the rack shaft 14 (see FIGS. 2 and 3) includes a rack bush 59 and a snap ring (retaining ring) 60.

The rack bush 59 includes a bush main body 61 and a pair of elastic rings 49 externally fitted to the bush main body 61. The bush main body 61 is made of synthetic resin and includes a tubular body 62 having a substantially cylindrical shape, and an outward facing flange-shaped engaging convex piece 63 protruding outward in the radial direction from the outer circumferential surface of the tubular body 62.

The engaging convex piece 63 is provided at an end portion of the bush main body 61 located on the opening side of the rack housing 22. In this example, the engaging convex piece 63 and the snap ring 60 form an engaging convex portion 64 arranged inside the engaging concave portion 44c. The engaging convex piece 63 has a width in the axial direction smaller than the width in the axial direction of the engaging concave portion 44c. In a state in which the rack bush 59 is internally fitted in the support hole portion 40 of the rack housing 22, the engaging convex piece 63 is arranged on the back side of the rack housing 22 of the inside of the engaging concave portion 44c. The engaging convex piece 63 has a substantially rectangular cross-sectional shape, and the amount of protrusion in the radial direction from the outer circumferential surface of the tubular body 62 is smaller than the groove depth of the engaging concave portion 44c.

The engaging convex piece 63 has a flat surface 68 existing on a virtual plane orthogonal to the central axis of the rack bush 59 (bush main body 61) on the outer side surface of the pair of outer side surfaces of the outer surface that is located on the back side of the rack housing 22. Note that of the pair of outer side surfaces of the outer surface of the engaging convex piece 63, the outer side surface located on the opening side of the rack housing 22 is configured by a flat surface arranged in parallel with the flat surface 68.

The snap ring 60 formed into a non-continuous annular shape (substantially C-shaped) having a discontinuous portion at one position in the circumferential direction by using a press to perform punching, surface pressing, and the like on a metal plate made of elastic material such as spring steel, stainless spring steel, or the like. The snap ring 60 has a pair of protrusions 65 protruding inward in the radial direction at the end portions on both sides in the circumferential direction, and has a locking hole 66 for locking a tool such as snap ring pliers or the like used when the snap ring 60 is elastically reduced in diameter at each of the protrusions 65.

The snap ring 60 is arranged on the opening side of the rack housing 22 of the inside of the engaging concave portion 44c. In other words, the snap ring 60 is arranged between the concave portion first inclined surface 45c of the engaging concave portion 44c and the engaging convex piece 63. The snap ring 60 has a convex portion first inclined surface 67 on the outer side surface of the pair of outer side surfaces that faces the concave portion first inclined surface 45c in the axial direction that is inclined in a direction toward the back side of the rack housing 22 while going outward in the radial direction. On the other hand, the outer side surface of the pair of outer side surfaces of the snap ring 60 that faces the engaging convex piece 63 in the axial direction is configured by a flat surface existing on a virtual plane orthogonal to the central axis of the snap ring 60. Therefore, the engaging convex portion 64 composed of the snap ring 60 and the engaging convex piece 63 has the convex portion first inclined surface 67 on the outer side surface located on the opening side of the rack housing 22, and has the flat surface 68 on the outer side surface located on the back side of the rack housing 22.

In this example, after the rack bush 59 is internally fitted inside the support hole portion 40 of the rack housing 22, and the engaging convex piece 63 is arranged inside the engaging concave portion 44c, the snap ring 60 is inserted inside of the engaging concave portion 44c. More specifically, in a state in which the snap ring 60 is reduced in diameter using a tool such as snap ring pliers or the like, the snap ring 60 is inserted until it is located on the inner diameter side of the engaging concave portion 44c, and then the tool is removed from the snap ring 60, and the diameter of the snap ring 60 is increased. As a result, the snap ring 60 is inserted inside of the engaging concave portion 44c. At this time, the elastic restoring force of the snap ring 60 presses the convex portion first inclined surface 67 outward in the radial direction against the concave portion first inclined surface 45c of the engaging concave portion 44c.

When the convex portion first inclined surface 67 is pressed outward in the radial direction with respect to the concave portion first inclined surface 45c, a reaction force F1 facing the back side of the rack housing 22 acts on the snap ring 60. Therefore, by using the reaction force F1, the engaging convex piece 63 is pressed in the axial direction, and the flat surface 68 of the engaging convex portion 64, which is a surface facing the back side of the rack housing 22, may be pressed in the axial direction against the flat surface 58 of the engaging concave portion 44c, which is the surface of the inner circumferential surface of the rack housing 22 that faces the opening side. Therefore, the engaging convex portion 64 can be engaged with the engaging concave portion 44c without looseness in the axial direction. Therefore, the slide bearing 37a may be supported with respect to the rack housing 22 without any looseness in the axial direction without having to hold the slide bearing 37a between two members in the axial direction.

Other configurations and effects are the same as in the first example.

Fifth Example

Figure 14:
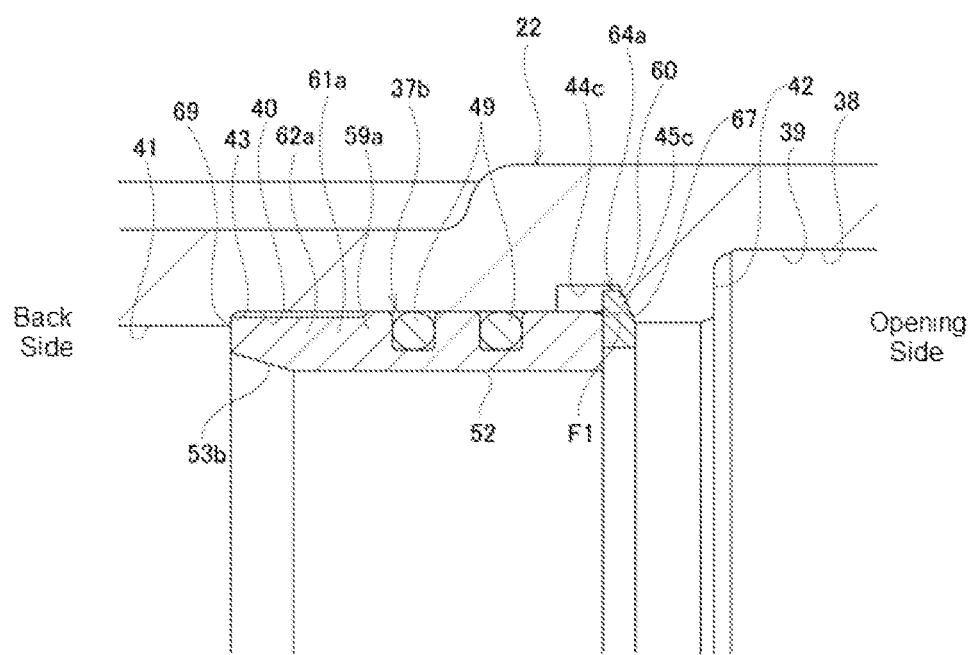
FIG. 14 is a diagram corresponding to FIG. 5, and illustrates a fifth example of an embodiment of the present invention.

A fifth example of an embodiment of the present invention will be described with reference to FIG. 14.

This example is a modified example of the fourth example. In this example, the bush main body 61a is composed of only a tubular body 62a having a substantially cylindrical shape. In other words, the bush main body 61a does not have the engaging convex piece as in the structure of the fourth example. Therefore, in the slide bearing 37b of this example, the engaging convex portion 64a arranged inside the engaging concave portion 44c of the rack housing 22 is configured by only the snap ring 60.

In this example, after the rack bush 59a is internally fitted into the support hole portion 40 of the rack housing 22, the snap ring 60 is inserted into the engaging concave portion 44c. At this time, the elastic restoring force of the snap ring 60 presses the convex portion first inclined surface 67 outward in the radial direction against the concave portion first inclined surface 45c of the engaging concave portion 44c. When the convex portion first inclined surface 67 is pressed outward in the radial direction with respect to the concave portion first inclined surface 45c, a reaction force F1 facing the back side of the rack housing 22 acts on the snap ring 60. Therefore, the reaction force F1 is used to press the rack bush 59a (bush main body 61a) in the axial direction. As a result, an outer portion in the radial direction of the back side end surface 69 of the bush main body 61a, which is the surface facing the back side of the rack housing 22, is pressed in the axial direction against the small-diameter stepped surface 43, which is the surface of the inner circumferential surface of the rack housing 22 facing the opening side. Therefore, the slide bearing 37b may be supported with respect to the rack housing 22 without any looseness in the axial direction without having to hold the slide bearing 37b between two members in the axial direction.

Other configurations and effects are the same as in the first and fourth examples.

Sixth Example

Figure 15:
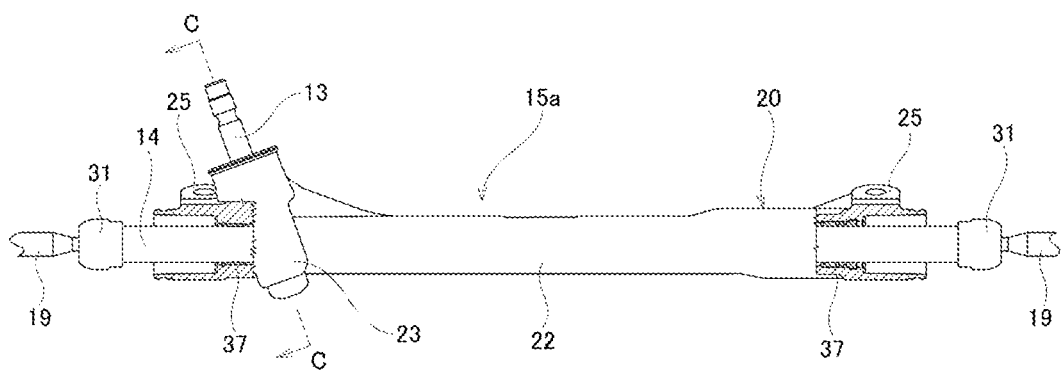
FIG. 15 is a diagram corresponding to FIG. 2, and illustrates a sixth example of an embodiment of the present invention.
Figure 16:
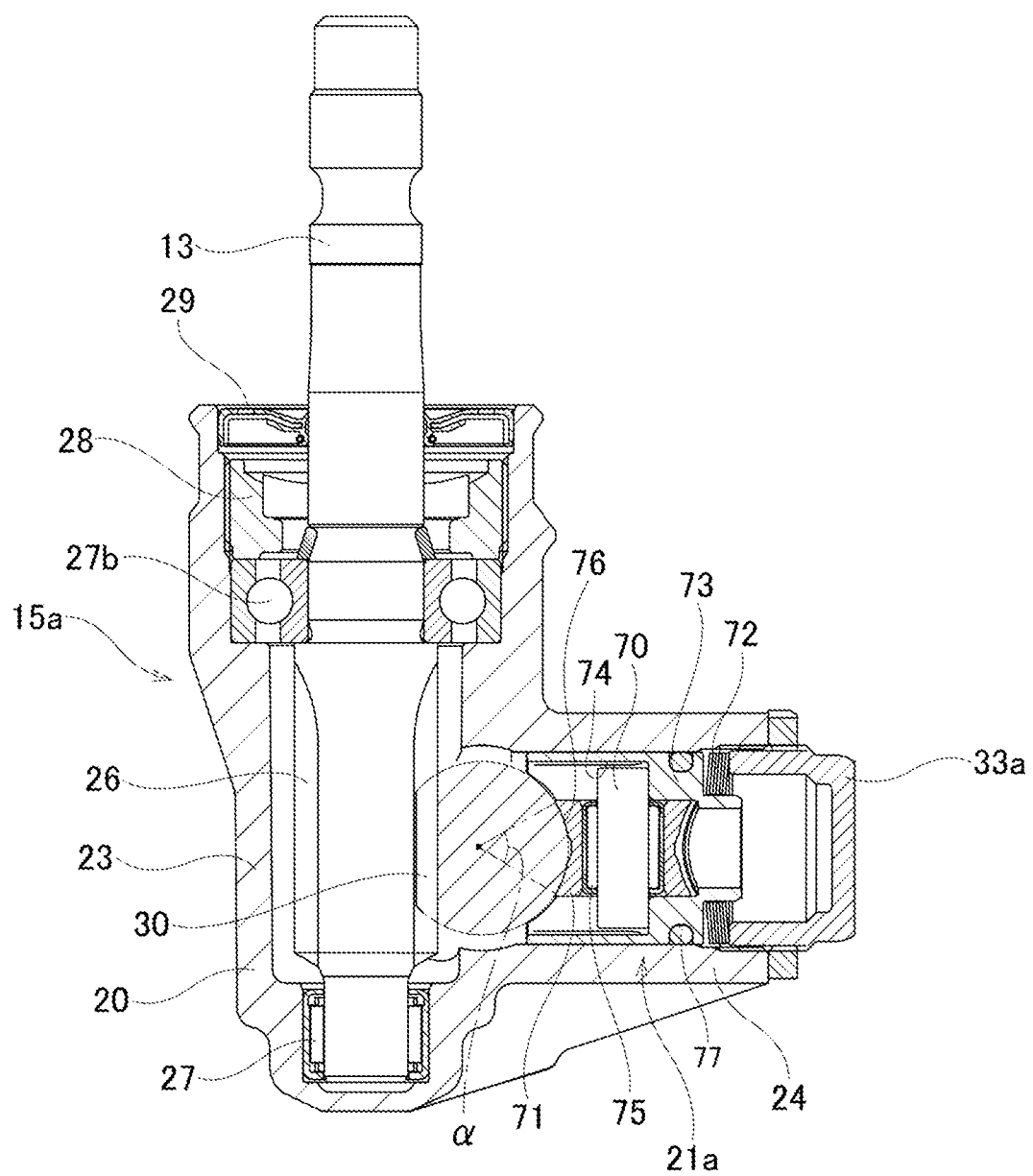
FIG. 16 is a cross-sectional view taken along the line C-C of FIG. 15.
Figure 17:
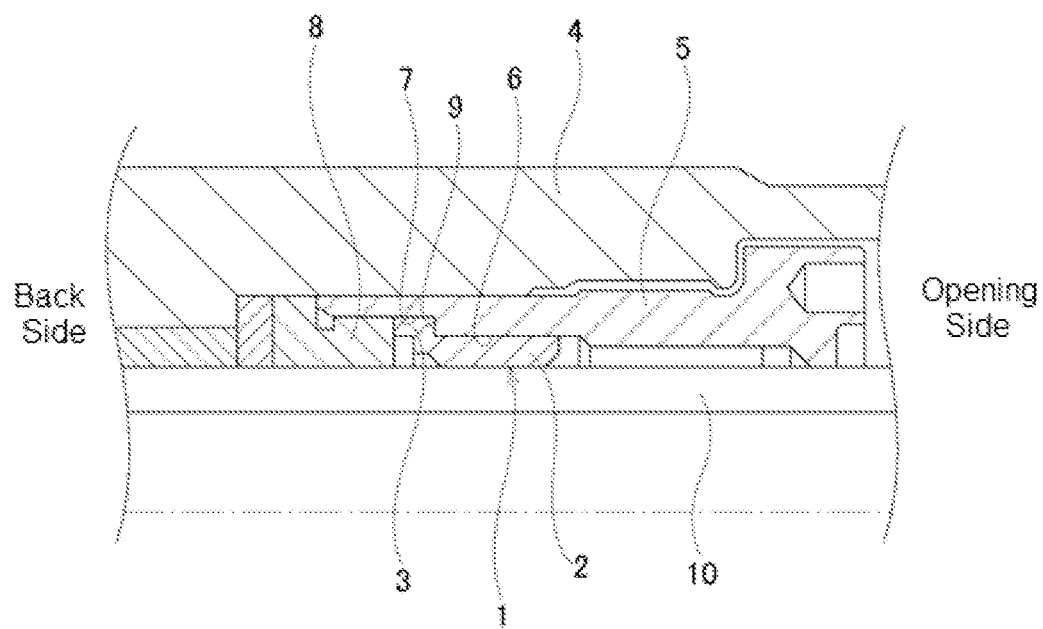
FIG. 17 is a view corresponding to FIG. 5 illustrating a conventional structure of a support portion of a rack shaft by a slide bearing.

A sixth example of an embodiment of the present invention will be described with reference to FIGS. 15 and 16.

In the steering gear unit 15a of this example, the structure of the pressing mechanism 21a that presses the back surface of the outer circumferential surface of the rack shaft 14 that is located on the opposite side in the radial direction of the front surface provided with the rack teeth 30 toward the pinion shaft 13 is different than the pressing mechanism 21 of the first example. The pressing mechanism 21a of this example is housed inside the cylinder portion 24 of the rack housing 22, and includes a pivot shaft 70, a pressing roller 71, and an elastic member 72.

The pivot shaft 70 is arranged parallel to the rack shaft 14 and is capable of moving far from or close to the rack shaft 14 in the axial direction of the cylinder portion 24. In order for this, the pressing block 73 is fitted inside the cylinder portion 24 so as to be movable in the front-rear direction, which is the axial direction of the cylinder portion 24, and the pivot shaft 70 is engaged inside a slot 74 that opens in front of the pressing block 73 so that there is no looseness in the axial direction of the rack shaft 14. Note that in the illustrated example, the O-ring 77 locked to the outer circumferential surface of the pressing block 73 is brought into elastic and slidable contact with the inner circumferential surface of the cylinder portion 24.

The pressing roller 71 is rotatably supported around the pivot shaft 70 by a radial needle bearing 75, and the outer circumferential surface thereof is brought into contact with a pressed portion 76 provided on the back surface of the rack shaft 14. The outer circumferential surface of the pressing roller 71 has a generatrix shape that follows the cross-sectional shape of the back surface (pressed portion 76) of the rack shaft 14.

The elastic member 72 is configured by one or a plurality of disc springs or coil springs, and presses the pivot shaft 70 toward the rack shaft 14 in the axial direction of the cylinder portion 24, or in other words, toward the front side. In this example, the elastic member 72 is configured by a disc spring arranged between the cover 33a screwed into the opening portion of the cylinder portion 24 and the pressing block 73.

The pressing mechanism 21a presses the pressing block 73 toward the front side due to the elasticity of the elastic member 72, thereby pressing the pivot shaft 70 toward the front side, and the outer circumferential surface of the pressing roller 71 that is rotatably supported around the pivot shaft 70 presses the pressed portion 76 of the rack shaft 14. As a result, the backlash of the engaging portion between the pinion teeth 26 and the rack teeth 30 is eliminated, and the engaged state of the pinion teeth 26 and the rack teeth 30 is properly maintained regardless of the force applied to the rack shaft 14 in the direction away from the pinion shaft 13 due to the power transmission at the engaging portion.

In the steering gear unit 15a of this example, when the rack shaft 14 slides in the axial direction, the pressing roller 71 rotates, whereby the sliding resistance of the rack shaft 14 is reduced.

In this example, the structure for slidably supporting the rack shaft 14 by the rack housing 22 is the same as the structure in the first example. In other words, the rack shaft 14 is slidably supported by a pair of slide bearings 37 in each of the portions near the openings on both sides in the axial direction of the rack housing 22, and the engaging convex portion 51 provided on the slide bearing 37 and the engaging concave portion 44 provided on the rack housing 22 engage with each other. Therefore, the slide bearing 37 may be supported with respect to the rack housing 22 without any looseness in the axial direction without having to hold the slide bearing 37 between two members in the axial direction.

In particular, the steering gear unit 15a of this example has a structure in which the pressed portion 76 of the rack shaft 14 is pressed toward the pinion shaft 13 by the pressing mechanism 21a having the pressing roller 71. In the pressing mechanism 21a provided with the pressing roller 71, the angle α formed by the contact portion between the outer circumferential surface of the pressing roller 71 and the back surface (pressed portion 76) of the rack shaft 14 is smaller than the angle β formed by the contact portion between the seat 36 attached to the pressing concave portion 35 of the rack guide 32 and the back surface of the rack shaft 14 in the pressing mechanism 21 of the first example. As the angle formed by the contact portion between the pressing surface of the pressing mechanism 21a and the back surface of the rack shaft 14 becomes smaller, the rack shaft 14 tends to become loose in the axial direction of the pinion shaft 13. Therefore, as in this example, in the steering gear unit 15a provided with the pressing mechanism 21a having the pressing roller 71, the effect of supporting the rack shaft 14 by the slide bearing 37 becomes remarkable.

Other configurations and effects are the same as in the structures of the first and fourth examples.

When implementing the present invention, the structures of the first to sixth examples of the embodiment can be carried out in appropriate combinations. Moreover, when implementing the present invention, the number of elastic rings that are externally fitted to the bush main body is not limited to two, and may be one or three or more, or may be omitted. In addition, the shape of the snap ring is not limited to the structures described in the first to sixth examples of the embodiment, and as long as the snap ring has at least an inclined outer side surface (convex portion first inclined surface) various known structures may be adopted. Furthermore, the number of slits in the axial direction formed in the bush main body (first axial slit and second axial slit) is not limited to the number in the first to sixth examples of the embodiment. As long as the bush main body may be expanded and contracted, the axial slit may be omitted. Moreover, in the first to sixth examples of the embodiment, a structure is described in which the engaging convex portion is discontinuous due to providing slits in the axial direction; however a shape may be used for the engaging convex portion that is discontinuous in the circumferential direction regardless of the presence of slits in the axial direction.

In the first to sixth examples of the embodiment, cases in which the rack shaft 14 is slidably supported by a pair of slide bearings 37 in the vicinity of the opening portions on both sides in the axial direction of the rack housing 22 have been described; however, in the rack and pinion type steering gear unit of the present invention, the rack shaft may also be slidably supported by a slide bearing only in the vicinity of the opening on the side of the rack housing far from the engaging portion between the pinion teeth and the rack teeth in the axial direction. However, from the aspect of suppressing looseness of the rack shaft, it is preferable that the rack shaft is slidably supported by a pair of slide bearings in the vicinity of the openings on both sides in the axial direction of the rack housing. In this case, the pair of slide bearings may have the same structure as each other, or may have different structures.

REFERENCE SIGNS LIST

1 Rack bush
2 Tubular body
3 Engaging convex portion
4 Rack housing
5 End case
6 Small-diameter hole portion
7 Large-diameter hole portion
8 Stopper
9 Stepped surface
10 Rack shaft
11 Steering apparatus
12 Steering wheel
13 Pinion shaft
14 Rack shaft
15, 15a Steering gear unit
16 Steering shaft
17 Universal joint
18 Intermediate shaft
19 Tie rod
20 Housing
21, 21a Pressing mechanism
22 Rack housing
23 Pinion housing
24 Cylinder portion
25 Mounting flange portion
26 Pinion teeth
27a Slide bearing
27b Rolling bearing
28 Retaining screw cylinder
29 Seal ring
30 Rack teeth
31 Spherical joint
32 Rack guide
33, 33a Cover
34 Coil spring
35 Pressing concave portion
36 Seat
37, 37a, 37b Slide bearing
38 Rack insertion hole
39 Opening hole portion
40 Support hole portion
41 Central hole portion
42 Large-diameter stepped surface
43 Small-diameter stepped surface
44, 44a, 44b, 44c Engaging concave portion
45, 45a, 45b, 45c Concave portion first inclined surface
46, 46a, 46b Concave portion second inclined surface
47 Rack bush
48 Rack bush main body
49 Elastic ring
50 Tubular body
51, 51a Engaging convex portion
52 Guide surface
53a, 53b Tapered surface
54 Locking groove
55, 55a Convex portion first inclined surface
56, 56a Convex portion second inclined surface
57a First axial slit
57b Second axial slit
58 Flat surface
59, 59a Rack bush
60 Snap ring
61, 61a Bush main body
62, 62a Tubular body
63 Engaging convex piece
64, 64a Engaging convex portion
65 Protrusion
66 Locking hole
67 Convex portion first inclined surface
68 Flat surface 69 Back side end surface
70 Pivot shaft
71 Pressing roller
72 Elastic member
73 Pressing block
74 Slot
75 Radial needle bearing
76 Pressed portion
77 O ring

The invention claimed is:

1. A rack and pinion type steering gear unit, comprising:
a housing having a rack housing having a tubular shape that is open on both sides in an axial direction thereof and including an engaging concave portion on an inner circumferential surface thereof, and a pinion housing arranged at a skew position with respect to the rack housing;
at least one slide bearing having a tubular body, and an engaging convex portion protruding further outward in a radial direction than an outer circumferential surface of the tubular body and arranged inside the engaging concave portion, the at least one slide bearing being fitted inside the rack housing;
a rack shaft having rack teeth, supported by an inner circumferential surface of the at least one slide bearing so as to be slidable in the axial direction, and arranged inside the rack housing; and
a pinion shaft having pinion teeth on an outer circumferential surface thereof, the pinion teeth engaging with the rack teeth, the pinion shaft being rotatably supported inside the pinion housing;
wherein
the at least one slide bearing includes a rack bush in which the tubular body and the entire engaging convex portion are integrally formed;
the engaging convex portion is provided on a portion of the at least one slide bearing located on an opening side of the rack housing;
the engaging concave portion includes a pair of inner side surfaces, an inner side surface of the pair of inner side surfaces that is located on the opening side of the rack housing including a concave portion first inclined surface that is inclined in a direction toward a back side of the rack housing while going outward in the radial direction, and an inner side surface of the pair of inner side surfaces that is located on the back side of the rack housing including a concave portion second inclined surface that is inclined in a direction toward the opening side of the rack housing while going outward in the radial direction;
the engaging convex portion includes a pair of outer side surfaces, an outer side surface of the pair of outer surfaces that faces the concave portion first inclined surface in the axial direction including a convex portion first inclined surface that is inclined in a direction toward the back side of the rack housing while going outward in the radial direction, and an outer side surface of the pair of outer side surfaces that faces the concave portion second inclined surface in the axial direction and faces the back side of the rack housing including a convex portion second inclined surface that is inclined in the direction toward the opening side of the rack housing while going outward in the radial direction;
by pressing the convex portion first inclined surface outward in the radial direction against the concave portion first inclined surface, the convex portion second inclined surface is pressed in the axial direction against the concave portion second inclined surface, and by pressing the convex portion second inclined surface outward in the radial direction against the concave portion second inclined surface, the convex portion first inclined surface is pressed in the axial direction against the concave portion first inclined surface; and
an inclination angle of the concave portion second inclined surface with respect to a central axis of the rack housing is smaller than an inclination angle of the concave portion first inclined surface with respect to the central axis of the rack housing.

2. The rack and pinion type steering gear unit according to claim 1, wherein
the at least one slide bearing is internally fitted in a portion of the rack housing in a vicinity of an opening portion on a side farther away from an engaging portion between the rack teeth and the pinion teeth in the axial direction.

3. The rack and pinion type steering gear unit according to claim 2, further comprising
a pressing mechanism pressing a pressed portion of an outer circumferential surface of the rack shaft that is located on a side in the radial direction opposite to a portion provided with the rack teeth toward the pinion shaft; and wherein
the pressing mechanism includes a pivot shaft supported to move away from or approach the rack shaft; a pressing roller, an outer circumferential surface of which slidably contacts with the pressed portion; and an elastic member pressing the pivot shaft toward the pinion shaft.

4. The rack and pinion type steering gear unit according to claim 1, wherein
the at least one slide bearing includes a pair of slide bearings; and
the pair of slide bearings is internally fitted in portions of the rack housing in the vicinity of opening portions on both sides in the axial direction.

5. The rack and pinion type steering gear unit according to claim 4, further comprising
a pressing mechanism pressing a pressed portion of an outer circumferential surface of the rack shaft that is located on a side in the radial direction opposite to a portion provided with the rack teeth toward the pinion shaft; and wherein
the pressing mechanism includes a pivot shaft supported to move away from or approach the rack shaft; a pressing roller, an outer circumferential surface of which slidably contacts with the pressed portion; and an elastic member pressing the pivot shaft toward the pinion shaft.

6. The rack and pinion type steering gear unit according to claim 1, wherein
a cross-sectional shape of the concave portion first inclined surface and the convex portion first inclined surface, and a cross-sectional shape of the concave portion second inclined surface and the convex portion second inclined surface are linear.

7. A rack and pinion type steering gear unit, comprising:
a housing having a rack housing having a tubular shape that is open on both sides in an axial direction thereof and including an engaging concave portion on an inner circumferential surface thereof, and a pinion housing arranged at a skew position with respect to the rack housing;

at least one slide bearing having a tubular body, and an engaging convex portion protruding further outward in a radial direction than an outer circumferential surface of the tubular body and arranged inside the engaging concave portion, the at least one slide bearing being fitted inside the rack housing;

a rack shaft having rack teeth, supported by an inner circumferential surface of the at least one slide bearing so as to be slidable in the axial direction, and arranged inside the rack housing; and a pinion shaft having pinion teeth on an outer circumferential surface thereof, the pinion teeth engaging with the rack teeth, the pinion shaft being rotatably supported inside the pinion housing;

wherein the at least one slide bearing includes a rack bush in which the tubular body and the entire engaging convex portion are integrally formed;

the engaging convex portion is provided on a portion of the at least one slide bearing located on an opening side of the rack housing;

the engaging concave portion includes a pair of inner side surfaces, an inner side surface of the pair of inner side surfaces that is located on the opening side of the rack housing including a concave portion first inclined surface that is inclined in a direction toward a back side of the rack housing while going outward in the radial direction, and an inner side surface of the pair of inner side surfaces that is located on the back side of the rack housing including a concave portion second inclined surface that is inclined in a direction toward the opening side of the rack housing while going outward in the radial direction;

the engaging convex portion includes a pair of outer side surfaces, an outer side surface of the pair of outer surfaces that faces the concave portion first inclined surface in the axial direction including a convex portion first inclined surface that is inclined in a direction toward the back side of the rack housing while going outward in the radial direction, and an outer side surface of the pair of outer side surfaces that faces the concave portion second inclined surface in the axial direction and faces the back side of the rack housing including a convex portion second inclined surface that is inclined in the direction toward the opening side of the rack housing while going outward in the radial direction;

by pressing the convex portion first inclined surface outward in the radial direction against the concave portion first inclined surface, the convex portion second inclined surface is pressed in the axial direction against the concave portion second inclined surface, and by pressing the convex portion second inclined surface outward in the radial direction against the concave portion second inclined surface, the convex portion first inclined surface is pressed in the axial direction against the concave portion first inclined surface; and an inclination angle of the concave portion first inclined surface with respect to a central axis of the rack housing is larger than an inclination angle of the convex portion first inclined surface with respect to a central axis of the at least one slide bearing, and an inclination angle of the concave portion second inclined surface with respect to the central axis of the rack housing is larger than an inclination angle of the convex portion second inclined surface with respect to the central axis of the at least one slide bearing.

8. The rack and pinion type steering gear unit according to claim 7, wherein a cross-sectional shape of the concave portion first inclined surface and the convex portion first inclined surface, and a cross-sectional shape of the concave portion second inclined surface and the convex portion second inclined surface are linear.

9. A rack and pinion type steering gear unit, comprising:

a housing having a rack housing having a tubular shape that is open on both sides in an axial direction thereof and including an engaging concave portion on an inner circumferential surface thereof, and a pinion housing arranged at a skew position with respect to the rack housing;

at least one slide bearing having a tubular body, and an engaging convex portion protruding further outward in a radial direction than an outer circumferential surface of the tubular body and arranged inside the engaging concave portion, the at least one slide bearing being fitted inside the rack housing;

a rack shaft having rack teeth, supported by an inner circumferential surface of the at least one slide bearing so as to be slidable in the axial direction, and arranged inside the rack housing; and a pinion shaft having pinion teeth on an outer circumferential surface thereof, the pinion teeth engaging with the rack teeth, the pinion shaft being rotatably supported inside the pinion housing;

wherein the at least one slide bearing includes a rack bush in which the tubular body and the entire engaging convex portion are integrally formed;

the engaging convex portion is provided on a portion of the at least one slide bearing located on an opening side of the rack housing;

the engaging concave portion includes a pair of inner side surfaces, an inner side surface of the pair of inner side surfaces that is located on the opening side of the rack housing including a concave portion first inclined surface that is inclined in a direction toward a back side of the rack housing while going outward in the radial direction, and an inner side surface of the pair of inner side surfaces that is located on the back side of the rack housing including a concave portion second inclined surface that is inclined in a direction toward the opening side of the rack housing while going outward in the radial direction;

the engaging convex portion includes a pair of outer side surfaces, an outer side surface of the pair of outer surfaces that faces the concave portion first inclined surface in the axial direction including a convex portion first inclined surface that is inclined in a direction toward the back side of the rack housing while going outward in the radial direction, and an outer side surface of the pair of outer side surfaces that faces the concave portion second inclined surface in the axial direction and faces the back side of the rack housing including a convex portion second inclined surface that is inclined in the direction toward the opening side of the rack housing while going outward in the radial direction;

by pressing the convex portion first inclined surface outward in the radial direction against the concave portion first inclined surface, the convex portion second inclined surface is pressed in the axial direction against the concave portion second inclined surface, and by pressing the convex portion second inclined surface outward in the radial direction against the concave portion second inclined surface, the convex portion first inclined surface is pressed in the axial direction against the concave portion first inclined surface; and a cross-sectional shape of the concave portion first inclined surface and the concave portion second inclined surface is a concave arc shape, and a cross-sectional shape of the convex portion first inclined surface and the convex portion second inclined surface is a convex arc shape.

\* \* \* \* \*